US012379977B2

(12) United States Patent
Walters et al.

(10) Patent No.: US 12,379,977 B2
(45) Date of Patent: Aug. 5, 2025

(54) SYSTEMS AND METHODS FOR SYNTHETIC DATA GENERATION FOR TIME-SERIES DATA USING DATA SEGMENTS

(71) Applicant: CAPITAL ONE SERVICES, LLC, McLean, VA (US)

(72) Inventors: Austin Walters, Savoy, IL (US); Mark Watson, Urbana, IL (US); Anh Truong, Champaign, IL (US); Jeremy Goodsitt, Champaign, IL (US); Reza Farivar, Champaign, IL (US); Kate Key, Effingham, IL (US); Vincent Pham, Champaign, IL (US); Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/360,482

(22) Filed: Jul. 27, 2023

(65) Prior Publication Data
US 2023/0376362 A1 Nov. 23, 2023

Related U.S. Application Data

(63) Continuation of application No. 17/102,526, filed on Nov. 24, 2020, now Pat. No. 11,822,975, which is a
(Continued)

(51) Int. Cl.
*G06F 16/248* (2019.01)
*G06F 8/71* (2018.01)
(Continued)

(52) U.S. Cl.
CPC ............... *G06F 9/541* (2013.01); *G06F 8/71* (2013.01); *G06F 9/54* (2013.01); *G06F 9/547* (2013.01);
(Continued)

(58) Field of Classification Search
CPC .......... G06F 16/24568; G06F 16/2237; G06F 16/285; G06F 16/906; G06F 16/90335;
(Continued)

(56) References Cited

U.S. PATENT DOCUMENTS 5,911,139 A 6/1999 Jain et al.
5,974,549 A 10/1999 Golan
(Continued)

FOREIGN PATENT DOCUMENTS

WO WO-02089054 A1 * 11/2002 ............. G06Q 40/00

OTHER PUBLICATIONS

Beaulieu-Jones et al., Privacy-preserving generative deep neural networks support 1 clinical data sharing, 7/52017, bioRxiv, total pages: 40, http://dx.doi.org/10.1101/159756 (Year: 2017).
(Continued)

*Primary Examiner* — Tarek Chbouki
(74) *Attorney, Agent, or Firm* — Foley & Lardner LLP

(57) ABSTRACT

Systems and methods for generating synthetic data are disclosed. For example, a system may include one or more memory units storing instructions and one or more processors configured to execute the instructions to perform operations. The operations may include receiving a dataset including time-series data. The operations may include generating a plurality of data segments based on the dataset, determining respective segment parameters of the data segments, and determining respective distribution measures of the data segments. The operations may include training a parameter model to generate synthetic segment parameters. Training the parameter model may be based on the segment parameters. The operations may include training a distribution model to generate synthetic data segments. Training the distribution model may be based on the distribution measures and the segment parameters. The operations may
(Continued)

include generating a synthetic dataset using the parameter model and the distribution model and storing the synthetic dataset.

17 Claims, 10 Drawing Sheets

Related U.S. Application Data continuation of application No. 16/405,989, filed on May 7, 2019, now Pat. No. 10,884,894.

(60) Provisional application No. 62/694,968, filed on Jul. 6, 2018.

(51) Int. Cl.

| | | |
|---|---|---|
| G06F 9/54 | (2006.01) | |
| G06F 11/3604 | (2025.01) | |
| G06F 11/362 | (2025.01) | |
| G06F 16/22 | (2019.01) | |
| G06F 16/242 | (2019.01) | |
| G06F 16/2455 | (2019.01) | |
| G06F 16/25 | (2019.01) | |
| G06F 16/28 | (2019.01) | |
| G06F 16/335 | (2019.01) | |
| G06F 16/903 | (2019.01) | |
| G06F 16/9032 | (2019.01) | |
| G06F 16/9038 | (2019.01) | |
| G06F 16/906 | (2019.01) | |
| G06F 16/93 | (2019.01) | |
| G06F 17/15 | (2006.01) | |
| G06F 17/16 | (2006.01) | |
| G06F 17/18 | (2006.01) | |
| G06F 18/20 | (2023.01) | |
| G06F 18/21 | (2023.01) | |
| G06F 18/2115 | (2023.01) | |
| G06F 18/213 | (2023.01) | |
| G06F 18/214 | (2023.01) | |
| G06F 18/22 | (2023.01) | |
| G06F 18/23 | (2023.01) | |
| G06F 18/24 | (2023.01) | |
| G06F 18/2411 | (2023.01) | |
| G06F 18/2415 | (2023.01) | |
| G06F 18/40 | (2023.01) | |
| G06F 21/55 | (2013.01) | |
| G06F 21/60 | (2013.01) | |
| G06F 21/62 | (2013.01) | |
| G06F 30/20 | (2020.01) | |
| G06F 40/117 | (2020.01) | |
| G06F 40/166 | (2020.01) | |
| G06F 40/20 | (2020.01) | |
| G06N 3/04 | (2023.01) | |
| G06N 3/044 | (2023.01) | |
| G06N 3/045 | (2023.01) | |
| G06N 3/06 | (2006.01) | |
| G06N 3/08 | (2023.01) | |
| G06N 3/088 | (2023.01) | |
| G06N 3/094 | (2023.01) | |
| G06N 5/00 | (2023.01) | |
| G06N 5/02 | (2023.01) | |
| G06N 5/04 | (2023.01) | |
| G06N 7/00 | (2023.01) | |
| G06N 7/01 | (2023.01) | |
| G06N 20/00 | (2019.01) | |
| G06Q 10/04 | (2023.01) | |
| G06T 7/194 | (2017.01) | |
| G06T 7/246 | (2017.01) | |
| G06T 7/254 | (2017.01) | |
| G06T 11/00 | (2006.01) | |
| G06V 10/70 | (2022.01) | |
| G06V 10/98 | (2022.01) | |
| G06V 30/194 | (2022.01) | |
| G06V 30/196 | (2022.01) | |
| H04L 9/40 | (2022.01) | |
| H04L 67/00 | (2022.01) | |
| H04L 67/306 | (2022.01) | |
| H04N 21/234 | (2011.01) | |
| H04N 21/81 | (2011.01) | |

(52) U.S. Cl.
CPC ...... *G06F 11/3608* (2013.01); *G06F 11/3628* (2013.01); *G06F 11/3636* (2013.01); *G06F 16/2237* (2019.01); *G06F 16/2264* (2019.01); *G06F 16/2423* (2019.01); *G06F 16/24568* (2019.01); *G06F 16/248* (2019.01); *G06F 16/254* (2019.01); *G06F 16/258* (2019.01); *G06F 16/283* (2019.01); *G06F 16/285* (2019.01); *G06F 16/288* (2019.01); *G06F 16/335* (2019.01); *G06F 16/90332* (2019.01); *G06F 16/90335* (2019.01); *G06F 16/9038* (2019.01); *G06F 16/906* (2019.01); *G06F 16/93* (2019.01); *G06F 17/15* (2013.01); *G06F 17/16* (2013.01); *G06F 17/18* (2013.01); *G06F 18/2115* (2023.01); *G06F 18/213* (2023.01); *G06F 18/214* (2023.01); *G06F 18/2148* (2023.01); *G06F 18/217* (2023.01); *G06F 18/2193* (2023.01); *G06F 18/22* (2023.01); *G06F 18/23* (2023.01); *G06F 18/24* (2023.01); *G06F 18/2411* (2023.01); *G06F 18/2415* (2023.01); *G06F 18/285* (2023.01); *G06F 18/40* (2023.01); *G06F 21/552* (2013.01); *G06F 21/60* (2013.01); *G06F 21/6245* (2013.01); *G06F 21/6254* (2013.01); *G06F 30/20* (2020.01); *G06F 40/117* (2020.01); *G06F 40/166* (2020.01); *G06F 40/20* (2020.01); *G06N 3/04* (2013.01); *G06N 3/044* (2023.01); *G06N 3/045* (2023.01); *G06N 3/06* (2013.01); *G06N 3/08* (2013.01); *G06N 3/088* (2013.01); *G06N 3/094* (2023.01); *G06N 5/00* (2013.01); *G06N 5/02* (2013.01); *G06N 5/04* (2013.01); *G06N 7/00* (2013.01); *G06N 7/01* (2023.01); *G06N 20/00* (2019.01); *G06Q 10/04* (2013.01); *G06T 7/194* (2017.01); *G06T 7/246* (2017.01); *G06T 7/248* (2017.01); *G06T 7/254* (2017.01); *G06T 11/001* (2013.01); *G06V 10/768* (2022.01); *G06V 10/993* (2022.01); *G06V 30/194* (2022.01); *G06V 30/1985* (2022.01); *H04L 63/1416* (2013.01); *H04L 63/1491* (2013.01); *H04L 67/306* (2013.01); *H04L 67/34* (2013.01); *H04N 21/23412* (2013.01); *H04N 21/8153* (2013.01); *G06T 2207/10016* (2013.01); *G06T 2207/20081* (2013.01); *G06T 2207/20084* (2013.01)

(58) Field of Classification Search
CPC .......... G06F 16/9038; G06F 16/90332; G06F 16/283; G06F 16/288; G06F 16/335; G06F 16/2264; G06F 16/2423; G06F 16/248; G06F 16/254; G06N 20/00; H04L 67/306

See application file for complete search history.

(56) References Cited

U.S. PATENT DOCUMENTS

| | | | |
|---|---|---|---|
| 6,137,912 A | 10/2000 | Kostrzewski et al. | |
| 6,269,351 B1 | 7/2001 | Black | |
| 6,456,990 B1 | 9/2002 | Hofmann et al. | |
| 7,788,191 B2 | 8/2010 | Jebara | |
| 7,953,682 B2 | 5/2011 | Smith et al. | |
| 8,375,014 B1 | 2/2013 | Brocato et al. | |
| 8,375,032 B2 | 2/2013 | Birdwell et al. | |
| 8,392,418 B2 | 3/2013 | Birdwell et al. | |
| 8,484,215 B2 | 7/2013 | Anderson | |
| 8,548,951 B2 | 10/2013 | Solmer et al. | |
| 8,706,659 B1 | 4/2014 | Mann et al. | |
| 8,782,744 B1 | 7/2014 | Fuller et al. | |
| 8,990,236 B2 | 3/2015 | Mizrahy et al. | |
| 9,171,146 B2 | 10/2015 | Vipat et al. | |
| 9,274,935 B1 | 3/2016 | Lachwani et al. | |
| 9,462,013 B1 | 10/2016 | Boss et al. | |
| 9,497,202 B1 | 11/2016 | Calo et al. | |
| 9,608,809 B1 | 3/2017 | Ghetti et al. | |
| 9,678,999 B1 | 6/2017 | Gibas et al. | |
| 9,716,842 B1 | 7/2017 | Worley et al. | |
| 9,754,190 B1 | 9/2017 | Guttmann | |
| 9,886,247 B2 | 2/2018 | Laredo et al. | |
| 9,912,698 B1 | 3/2018 | Thioux et al. | |
| 9,954,893 B1 | 4/2018 | Zhao et al. | |
| 10,122,969 B1 | 11/2018 | Lim et al. | |
| 10,212,428 B2 | 2/2019 | Trepte | |
| 10,282,907 B2 | 5/2019 | Miller et al. | |
| 10,380,236 B1 | 8/2019 | Ganu et al. | |
| 10,453,220 B1 | 10/2019 | Mihal et al. | |
| 10,733,482 B1 | 8/2020 | Lee et al. | |
| 10,860,629 B1 | 12/2020 | Gangadharaiah et al. | |
| 2002/0103793 A1 | 8/2002 | Koller et al. | |
| 2003/0003861 A1 | 1/2003 | Kagemoto et al. | |
| 2003/0074368 A1 | 4/2003 | Schuetze et al. | |
| 2006/0031622 A1 | 2/2006 | Jardine | |
| 2006/0123009 A1* | 6/2006 | Bruno | G06F 16/217 |
| 2007/0169017 A1 | 7/2007 | Coward | |
| 2007/0271287 A1 | 11/2007 | Acharya et al. | |
| 2008/0168339 A1 | 7/2008 | Hudson et al. | |
| 2008/0270363 A1 | 10/2008 | Hunt et al. | |
| 2008/0288424 A1* | 11/2008 | Iyengar | G06Q 10/00 706/12 |
| 2008/0288889 A1 | 11/2008 | Hunt et al. | |
| 2009/0018996 A1 | 1/2009 | Hunt et al. | |
| 2009/0055331 A1 | 2/2009 | Stewart | |
| 2009/0055477 A1 | 2/2009 | Flesher et al. | |
| 2009/0110070 A1 | 4/2009 | Takahashi et al. | |
| 2009/0254971 A1 | 10/2009 | Herz et al. | |
| 2010/0251340 A1 | 9/2010 | Martin et al. | |
| 2010/0254627 A1 | 10/2010 | Tehrani et al. | |
| 2010/0332210 A1 | 12/2010 | Birdwell et al. | |
| 2010/0332474 A1 | 12/2010 | Birdwell et al. | |
| 2011/0106743 A1 | 5/2011 | Duchon | |
| 2012/0174224 A1 | 7/2012 | Thomas et al. | |
| 2012/0284213 A1 | 11/2012 | Lin et al. | |
| 2012/0303633 A1* | 11/2012 | He | G06F 16/2453 707/E17.051 |
| 2013/0117830 A1 | 5/2013 | Erickson et al. | |
| 2013/0124526 A1 | 5/2013 | Birdwell | |
| 2013/0159309 A1 | 6/2013 | Birdwell et al. | |
| 2013/0159310 A1 | 6/2013 | Birdwell et al. | |
| 2013/0167192 A1 | 6/2013 | Hickman et al. | |
| 2014/0053061 A1 | 2/2014 | Chasen et al. | |
| 2014/0195466 A1 | 7/2014 | Phillipps et al. | |
| 2014/0201126 A1 | 7/2014 | Zadeh et al. | |
| 2014/0278339 A1 | 9/2014 | Aliferis et al. | |
| 2014/0317021 A1 | 10/2014 | Weber et al. | |
| 2014/0324760 A1 | 10/2014 | Marwah et al. | |
| 2014/0325662 A1 | 10/2014 | Foster et al. | |
| 2014/0365549 A1 | 12/2014 | Jenkins | |
| 2015/0032761 A1 | 1/2015 | Pasternack | |
| 2015/0058388 A1 | 2/2015 | Smigelski | |
| 2015/0066793 A1 | 3/2015 | Brown | |
| 2015/0100537 A1 | 4/2015 | Grieves et al. | |
| 2015/0134413 A1 | 5/2015 | Deshpande et al. | |
| 2015/0220734 A1 | 8/2015 | Nalluri et al. | |
| 2015/0241873 A1 | 8/2015 | Goldenberg et al. | |
| 2015/0309987 A1 | 10/2015 | Epstein et al. | |
| 2016/0019271 A1 | 1/2016 | Ma et al. | |
| 2016/0037170 A1 | 2/2016 | Zhang et al. | |
| 2016/0057107 A1 | 2/2016 | Call et al. | |
| 2016/0092476 A1 | 3/2016 | Stojanovic et al. | |
| 2016/0092557 A1 | 3/2016 | Stojanovic et al. | |
| 2016/0110657 A1 | 4/2016 | Gibiansky et al. | |
| 2016/0119377 A1 | 4/2016 | Goldberg et al. | |
| 2016/0132787 A1 | 5/2016 | Drevo et al. | |
| 2016/0162688 A1 | 6/2016 | Call et al. | |
| 2016/0197803 A1 | 7/2016 | Talbot et al. | |
| 2016/0308900 A1 | 10/2016 | Sadika et al. | |
| 2016/0371601 A1 | 12/2016 | Grove et al. | |
| 2017/0011105 A1 | 1/2017 | Shet et al. | |
| 2017/0083990 A1 | 3/2017 | Hou et al. | |
| 2017/0147930 A1 | 5/2017 | Bellala et al. | |
| 2017/0220336 A1 | 8/2017 | Chen et al. | |
| 2017/0236183 A1 | 8/2017 | Klein et al. | |
| 2017/0249432 A1 | 8/2017 | Grantcharov | |
| 2017/0249564 A1 | 8/2017 | Garvey et al. | |
| 2017/0323327 A1 | 11/2017 | Pachisia et al. | |
| 2017/0331858 A1 | 11/2017 | Clark, III et al. | |
| 2017/0359570 A1 | 12/2017 | Holzer et al. | |
| 2018/0018590 A1 | 1/2018 | Szeto et al. | |
| 2018/0108149 A1 | 4/2018 | Levinshtein | |
| 2018/0115706 A1 | 4/2018 | Kang et al. | |
| 2018/0121797 A1 | 5/2018 | Prabhu et al. | |
| 2018/0150548 A1 | 5/2018 | Shah et al. | |
| 2018/0165475 A1 | 6/2018 | Veeramachaneni et al. | |
| 2018/0165728 A1 | 6/2018 | McDonald et al. | |
| 2018/0173730 A1 | 6/2018 | Copenhaver et al. | |
| 2018/0173958 A1 | 6/2018 | Hu et al. | |
| 2018/0181802 A1 | 6/2018 | Chen et al. | |
| 2018/0198602 A1 | 7/2018 | Duffy et al. | |
| 2018/0199066 A1 | 7/2018 | Ross | |
| 2018/0204111 A1 | 7/2018 | Zadeh et al. | |
| 2018/0240041 A1 | 8/2018 | Koch et al. | |
| 2018/0248827 A1 | 8/2018 | Scharber et al. | |
| 2018/0253894 A1 | 9/2018 | Krishan et al. | |
| 2018/0260474 A1 | 9/2018 | Surdeanu et al. | |
| 2018/0260704 A1 | 9/2018 | Sun et al. | |
| 2018/0268255 A1 | 9/2018 | Surazhsky et al. | |
| 2018/0268286 A1 | 9/2018 | Dasgupta | |
| 2018/0276332 A1 | 9/2018 | Fan et al. | |
| 2018/0307945 A1* | 10/2018 | Haigh | G06F 18/214 |
| 2018/0307978 A1 | 10/2018 | Ar et al. | |
| 2018/0336463 A1 | 11/2018 | Bloom | |
| 2018/0367484 A1 | 12/2018 | Rodriguez et al. | |
| 2019/0005142 A1 | 1/2019 | Tseng | |
| 2019/0005657 A1 | 1/2019 | Gao et al. | |
| 2019/0026956 A1 | 1/2019 | Gausebeck et al. | |
| 2019/0034833 A1 | 1/2019 | Ding et al. | |
| 2019/0035047 A1 | 1/2019 | Lim et al. | |
| 2019/0042290 A1 | 2/2019 | Bailey et al. | |
| 2019/0051051 A1 | 2/2019 | Kaufman et al. | |
| 2019/0056722 A1* | 2/2019 | Abbaszadeh | G06F 21/55 |
| 2019/0057509 A1 | 2/2019 | Lv et al. | |
| 2019/0139641 A1 | 5/2019 | Itu et al. | |
| 2019/0147371 A1 | 5/2019 | Deo et al. | |
| 2019/0188605 A1 | 6/2019 | Zavesky et al. | |
| 2019/0196600 A1 | 6/2019 | Rothberg et al. | |
| 2019/0220653 A1 | 7/2019 | Wang et al. | |
| 2019/0228495 A1* | 7/2019 | Tremblay | B25J 9/1661 |
| 2019/0251397 A1 | 8/2019 | Tremblay et al. | |
| 2019/0286938 A1* | 9/2019 | Backhus | G06F 18/214 |
| 2019/0294923 A1 | 9/2019 | Riley et al. | |
| 2019/0354836 A1 | 11/2019 | Shah et al. | |
| 2019/0370431 A1* | 12/2019 | Sha | G06N 3/047 |
| 2019/0370432 A1* | 12/2019 | Sha | G06F 30/392 |
| 2020/0012896 A1* | 1/2020 | Yoo | G06V 10/82 |
| 2020/0193288 A1 | 6/2020 | Li et al. | |
| 2020/0272422 A1* | 8/2020 | Okada | G06F 17/18 |
| 2020/0276680 A1* | 9/2020 | Green | B23Q 11/0092 |
| 2021/0117420 A1 | 4/2021 | Pang et al. | |
| 2021/0148213 A1 | 5/2021 | Madasu et al. | |
| 2022/0405644 A1* | 12/2022 | Szeto | G06N 20/00 |

(56) References Cited

U.S. PATENT DOCUMENTS

OTHER PUBLICATIONS

Brkic et al., I Know That Person: Generative Full Body and Face De-Identification of People in Images, 2017 IEEE Conference on Computer Vision and Pattern Recognition Workshops, pp. 1319-1328 (Year: 2017).

C. Willems, T. Holz and F. Freiling, "Toward Automated Dynamic Malware Analysis Using CWSandbox," in IEEE Security & Privacy, vol. 5, No. 2, pp. 32-39, Mar.-Apr. 2007. (Year: 2007).

Dernoncourt, F., Lee, J. Y., Uzuner, 0., & Szolovits, P. (2017). De-identification of patient notes with recurrent neural networks. Journal of the American Medical Informatics Association, 24(3), 596-606. (Year: 2017).

Domadia, S. G., & Zaveri, T. (May 2011). Comparative analysis of unsupervised and supervised image classification techniques. In Proceeding of National Conference on Recent Trends in Engineering & Technology (pp. 1-5). (Year: 2011).

Escovedo, Tatiana, et al. "DetectA: abrupt concept drift detection in non-stationary environments." Applied Soft Computing 62 (2017 ): 119-133. (Year: 2017).

Gidaris, S., & Komodakis, N. (2017). Detect, replace, refine: Deep structured prediction for pixel wise labeling. In Proceedings of the IEEE Conference on Computer Vision and Pattern Recognition (pp. 5248-5257). (Year: 2017).

Hasegawa et al. Interoperability for Mobile Agents by Incarnation Agents. AAMAS'Jul. 14-18, 03,2003, Melbourne, Australia. (Year: 2003).

Jiang, Z., Zhao, C., He, B., Guan, Y., & Jiang, J. (2017). De-identification of medical records using conditional random fields and long short-term memory networks. Journal of biomedical informatics, 75, S43-S53. (Year: 2017).

Kim, Yoon. "Convolutional neural networks for sentence classification." arXiv preprint arXiv: 1408. 5882 (2014). (Year: 2014).

Laszlo, M., & Mukherjee, S. (2013). Optimal univariate microaggregation with data suppression. Journal of Systems and Software, 86(3), 677-682. (Year: 2013).

Malekzadeh et al., Replacement Auto Encoder: A Privacy-Preserving Algorithm for Sensory Data Analysis, 2018 IEEE/ACM Third International Conference on Internet-of-Things Design and Implementation, pp. 166-176 (Year: 2018).

Marc Aurelio Ranzato, Arthur Szlam, Joan Bruna, Michael Mathieu, Ronan Collobert, and Sumit Chopra, "Video (Language) Modeling: A Baseline For Generative Models Of Natural Videos", Article, May 4, 2016, 15 pages, Courant Institute of Mathematical Sciences.

Matthias Feurer, Jost Tobias Springenberg, Aaron Klein, Manuel Blum, Katharina Eggensperger, and Frank Hutter, "Efficient and Robust Automated Machine Learning", Advances in Neural Information Processing Systems 28 (Dec. 2015) HTTP://papers.nips.cc/pa.

Park et al., Data Synthesis based on Generative Adversarial Networks, Aug. 2018, Proceedings of the VLDB Endowment, vol. 11, No. 10, pp. 1071-1083 (Year: 2018).

Qin Gao, Will Lewis, Chris Quirk, and Mei-Yuh Hwang. 2011. Incremental training and intentional over-fitting of word alignment. In Proceedings of MT Summit XIII. (Year: 2011).

Roberts, Mike. "Serverless Architectures". https://martinfowler.com/articles/serverless.html. May 22, 2018. Accessed Jul. 22, 2019. (Year: 2018).

Vendrick, Carl, Hamed Pirsiavash, and Antonio Torralba. "Generating videos with scene dynamics." Advances In Neural Information Processing Systems. 2016 (Year: 2016).

Wiktionary. "Spin Up". https://en.wiktionary.org/w/index.php?title=spin_up&oldid=49727714. Jun. 15, 2018. Accessed Jul. 19, 2019. (Year: 2018).

Xue, Tianfan, et al. "Visual dynamics: Probabilistic future frame synthesis via cross convolutional networks." Advances in Neural Information Processing Systems. 2016 (Year: 2016).

Neha Patki, Roy Wedge, and Kalyan Veeramachanenl, "The Synthetic data vault", 2016 IEEE International Conference on Data Science and Advanced Analytics (DSAA) (Oct. 17, 2016) Cambridge, MA, 12 pp.

\* cited by examiner

200

202: Receive a Dataset

204: Generate Data Segments, and Determine Segment Parameters and Distribution Measures 206: Generate Data Segments, and Determine Segment Parameters and Distribution Measures

208

500

---

Generate, via the Parameter Model, a Series of Synthetic Segment-Parameters
502

↓

Generate, via the Distribution Model, a Series of Synthetic Data-Segments Based on the Series of Synthetic Segment Parameters
504

↓

Generate a Synthetic Dataset by Combining Synthetic Data-Segments
506

FIG. 5

SYSTEMS AND METHODS FOR SYNTHETIC DATA GENERATION FOR TIME-SERIES DATA USING DATA SEGMENTS

CROSS-REFERENCE TO RELATED APPLICATIONS

This application is a continuation of U.S. patent application Ser. No. 17/102,526, filed on Nov. 24, 2020, which is a continuation of U.S. patent application Ser. No. 16/405,989, filed on May 7, 2019, which issued as U.S. Pat. No. 10,884,894 on Jan. 5, 2021, which claims the benefit of U.S. Provisional Application No. 62/694,968, filed Jul. 6, 2018. The disclosures of the above-referenced applications are expressly incorporated herein by reference in their entireties.

BACKGROUND

Data management systems have a need to efficiently manage and generate synthetic time-series data that appear realistic (i.e., appears to be actual data). Synthetic data includes, for example, anonymized actual data or fake data. Synthetic data is used in a wide variety of fields and systems, including public health systems, financial systems, environmental monitoring systems, product development systems, and other systems. Synthetic data may be needed where actual data reflecting real-world conditions, events, and/or measurements are unavailable or where confidentiality is required. Synthetic data may be used in methods of data compression to create or recreate a realistic, larger-scale data set from a smaller, compressed dataset (e.g., as in image or video compression). Synthetic data may be desirable or needed for multidimensional datasets (e.g., data with more than three dimensions).

Conventional systems and methods of generating synthetic time-series data generally suffer from deficiencies. For example, conventional approaches may be limited to generating synthetic data in a small number of dimensions (e.g., two-dimensional image data), but be unable to generate time-series data for higher-dimensional datasets (e.g., environmental data with multiple, interdependent variables). Further, conventional approaches may be unable to produce synthetic data that realistically captures changes in data values over time (e.g., conventional approaches may produce unrealistic video motion).

Conventional systems and methods may be limited to generating synthetic data within an observed range of parameters of actual data (e.g., a series of actual minimum and maximum values), rather than modeled synthetic-parameters (e.g., a series of synthetic minimum and maximum values). Some approaches may use pre-defined data distributions to generate synthetic data, an approach that may require human judgment to choose a data distribution rather than using machine-learning to choose a distribution to generate synthetic data. Some approaches may be limited to generating time-series data in just one direction (e.g., forward in time). Some approaches may be limited to generating data within a limited time scale (e.g., hours, weeks, days, years, etc.) and may not be robust across time scales.

Therefore, in view of the shortcomings and problems with conventional approaches to generating synthetic time-series data, there is a need for robust, unconventional approaches that generate realistic synthetic time-series data.

SUMMARY

The disclosed embodiments provide unconventional methods and systems for generating synthetic time-series data. As compared to conventional solutions, the embodiments may quickly generate accurate, synthetic multi-dimensional time-series data at least because methods may involve machine learning methods to optimize segment parameters and distribution measures of data segments at various time scales.

Consistent with the present embodiments, a system for generating synthetic datasets is disclosed. The system may include one or more memory units storing instructions and one or more processors configured to execute the instructions to perform operations. The operations may include receiving a dataset comprising time-series data. The operations may include generating a plurality of data segments based on the dataset, determining respective segment parameters of the data segments, and determining respective distribution measures of the data segments. The operations may include training a parameter model to generate synthetic segment parameters. Training the parameter model may be based on the segment parameters. The operations may include training a distribution model to generate synthetic data segments. Training the distribution model may be based on the distribution measures and the segment parameters. The operations may include generating a synthetic dataset using the parameter model and the distribution model and storing the synthetic dataset.

Consistent with the present embodiments, a method for generating synthetic datasets is disclosed. The method may include receiving a dataset comprising time-series data. The method may include generating a plurality of data segments based on the dataset, determining respective segment parameters of the data segments, and determining respective distribution measures of the data segments. The method may include training a parameter model to generate synthetic segment parameters. Training the parameter model may be based on the segment parameters. The method may include training a distribution model to generate synthetic data segments. Training the distribution model may be based on the distribution measures and the segment parameters. The method may include generating a synthetic dataset using the parameter model and the distribution model and storing the synthetic dataset.

Consistent with the present embodiments, non-transitory computer readable storage media may store program instructions, which are executed by at least one processor device and perform any of the methods described herein.

The disclosed systems and methods may be implemented using a combination of conventional hardware and software as well as specialized hardware and software, such as a machine constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 5 depicts an exemplary process for generating synthetic data, consistent with disclosed embodiments.

DESCRIPTION OF THE EMBODIMENTS

Consistent with disclosed embodiments, systems and methods to generate synthetic data are disclosed.

Embodiments consistent with the present disclosure may include datasets. Datasets may comprise actual data reflecting real-world conditions, events, and/or measurements. In some embodiments, disclosed systems and methods may fully or partially involve synthetic data (e.g., anonymized actual data or fake data). Datasets may involve time-series data, numeric data, text data, and/or image data. For example, datasets may include transaction data, financial data, demographic data, public data, government data, environmental data, traffic data, network data, transcripts of video data, genomic data, proteomic data, and/or other data.

Datasets may have a plurality of dimensions, the dimensions corresponding to variables. For example, a dataset may include a time series of three-dimensional spatial data. Datasets of the embodiments may have any number of dimensions. As an illustrative example, datasets of the embodiments may include time-series data with dimensions corresponding to longitude, latitude, cancer incidence, population density, air quality, and water quality. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (i.e., structure), including a data type, key-value pair, label, metadata, field, relationship, view, index, package, procedure, function, trigger, sequence, synonym, link, directory, queue, or the like. Datasets of the embodiments may contain foreign keys, i.e., data elements that appear in multiple datasets and may be used to cross-reference data and determine relationships between datasets. Foreign keys may be unique (e.g., a personal identifier) or shared (e.g., a postal code). Datasets of the embodiments may be "clustered," i.e., a group of datasets may share common features, such as overlapping data, shared statistical properties, etc. Clustered datasets may share hierarchical relationships (i.e., data lineage).

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
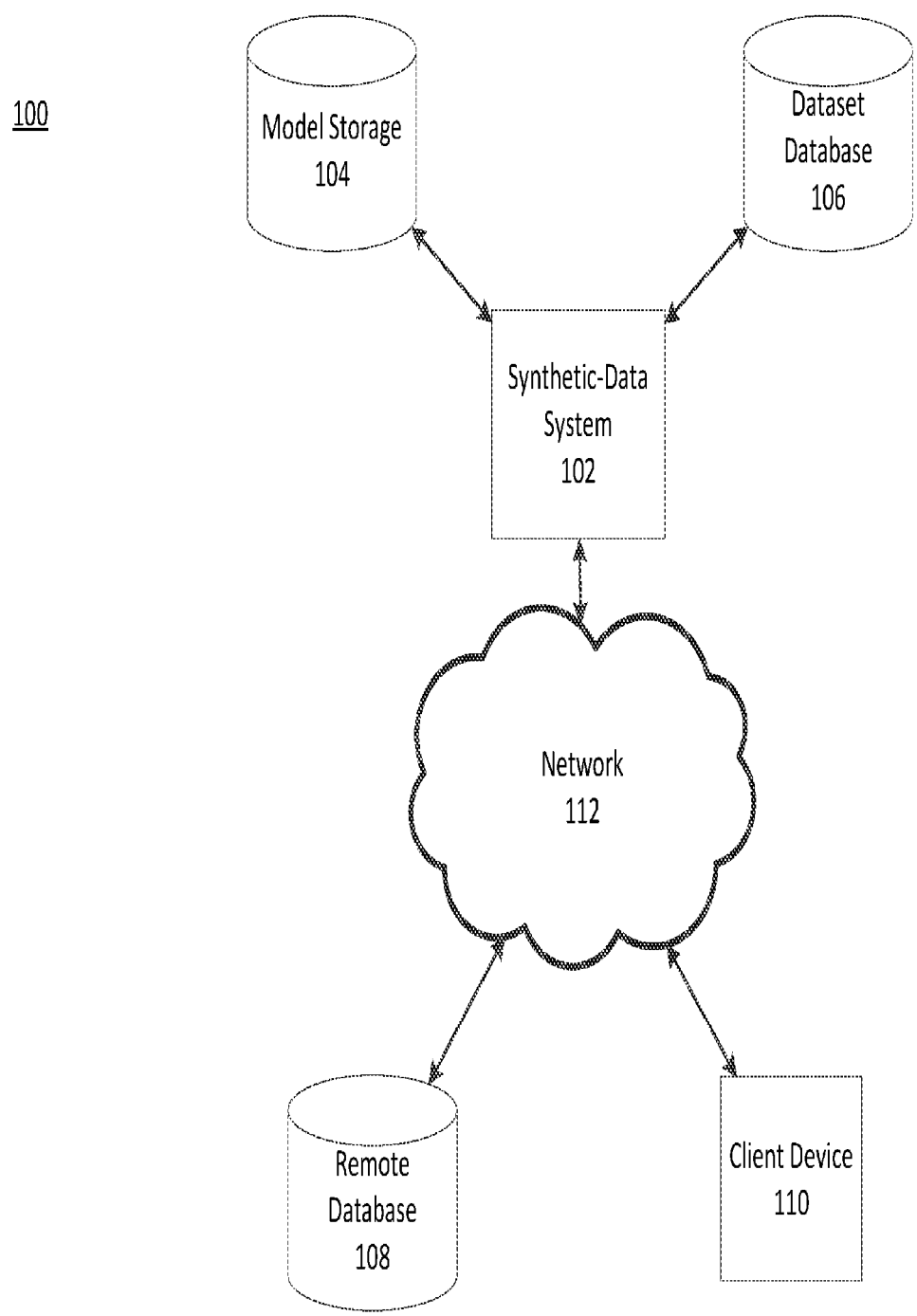
FIG. 1 depicts an exemplary system for generating synthetic data, consistent with disclosed embodiments.

FIG. 1 depicts exemplary system 100 for generating synthetic datasets, consistent with disclosed embodiments. As shown, system 100 may include a synthetic-data system 102, a model storage 104, a dataset database 106, a remote database 108, and a client device 110. Components of system 100 may be connected to each other through a network 112.

In some embodiments, aspects of system 100 may be implemented on one or more cloud services designed to generate ("spin-up") one or more ephemeral container instances (e.g., AMAZON LAMBDA instances) in response to event triggers, assign one or more tasks to a container instance, and terminate ("spin-down") a container instance upon completion of a task. By implementing methods using cloud services, disclosed systems may efficiently provision resources based on demand and provide security advantages because the ephemeral container instances may be closed and destroyed upon completion of a task. That is, the container instances do not permit access from outside using terminals or remote shell tools like SSH, RTP, FTP, or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 may be arranged in various ways and implemented with any suitable combination of hardware, firmware, and/or software, as applicable. For example, as compared to the depiction in FIG. 1, system 100 may include a larger or smaller number of synthetic-data systems, model storages, dataset databases, remote databases, client devices and/or networks. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Synthetic-data system 102 may include a computing device, a computer, a server, a server cluster, a plurality of server clusters, and/or a cloud service, consistent with disclosed embodiments. Synthetic-data system 102 may include one or more memory units and one or more processors configured to perform operations consistent with disclosed embodiments. Synthetic-data system 102 may include computing systems configured to generate, receive, retrieve, store, and/or provide data models and/or datasets, consistent with disclosed embodiments. Synthetic-data system 102 may include computing systems configured to generate and train models, consistent with disclosed embodiments. Synthetic-data system 102 may be configured to receive data from, retrieve data from, and/or transmit data to other components of system 100 and/or computing components outside system 100 (e.g., via network 112). Synthetic-data system 102 is disclosed in greater detail below (in reference to FIG. 3).

Model storage 104 may be hosted on one or more servers, one or more clusters of servers, or one or more cloud services. Model storage 104 may be connected to network 112 (connection not shown). In some embodiments, model storage 104 may be a component of synthetic-data system 102 (not shown).

Model storage 104 may include one or more databases configured to store data models (e.g., machine-learning models or statistical models) and descriptive information of data models. Model storage 104 can be configured to provide information regarding available data models to a user or another system. Databases may include cloud-based databases, cloud-based buckets, or on-premises databases. The information may include model information, such as the type and/or purpose of a model and any measures of classification error. Model storage 104 may include one or more databases configured to store indexed and clustered models for use by synthetic-data system 100. For example, model storage 104 may store models associated with generalized representations of those models (e.g., neural network architectures stored in TENSORFLOW or other standardized formats). Databases may include cloud-based databases (e.g., AMAZON WEB SERVICES RELATIONAL DATABASE SERVICE) or on-premises databases. Model storage 104 may include a searchable model index (e.g, a B-Tree or other index). The index may be based on model characteristics (e.g., model type, model parameters, model hyperparameters).

Dataset database 106 may include one or more databases configured to store data for use by system 100, consistent with disclosed embodiments. In some embodiments, dataset database may be configured to store datasets and/or one or more dataset indexes, consistent with disclosed embodiments. Dataset database 106 may include a cloud-based database (e.g., AMAZON WEB SERVICES RELATIONAL DATABASE SERVICE) or an on-premises database. Dataset database 106 may include datasets, model data (e.g., model parameters, training criteria, performance metrics, etc.), and/or other data, consistent with disclosed embodiments. Dataset database 106 may include data received from one or more components of system 100 and/or computing components outside system 100 (e.g., via network 112). In some embodiments, dataset database 106 may be a component of synthetic-data system 102 (not shown). Dataset database 106 may include a searchable index of datasets, the index being based on data profiles of datasets (e.g, a B-Tree or other index).

Remote database 108 may include one or more databases configured to store data for use by system 100, consistent with disclosed embodiments. Remote database 108 may be configured to store datasets and/or one or more dataset indexes, consistent with disclosed embodiments. Remote database 108 may include a cloud-based database (e.g., AMAZON WEB SERVICES RELATIONAL DATABASE SERVICE) or an on-premises database.

Client device 110 may include one or more memory units and one or more processors configured to perform operations consistent with disclosed embodiments. In some embodiments, client device 110 may include hardware, software, and/or firmware modules. Client device 110 may include a mobile device, a tablet, a personal computer, a terminal, a kiosk, a server, a server cluster, a cloud service, a storage device, a specialized device configured to perform methods according to disclosed embodiments, or the like.

At least one of synthetic-data system 102, model storage 104, dataset database 106, remote database 108, or client device 110 may be connected to network 112. Network 112 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. Network 112 may be connected to other networks (not depicted in FIG. 1) to connect the various system components to each other and/or to external systems or devices. In some embodiments, network 112 may be a secure network and require a password to access the network.

Figure 2A:
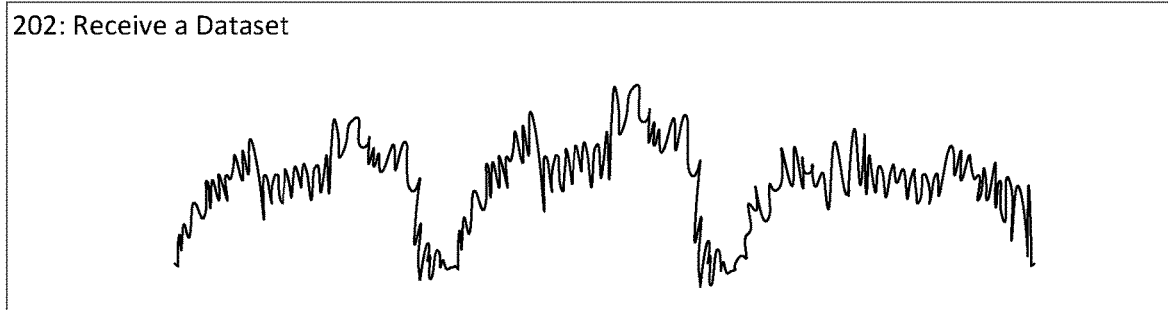
FIG. 2A and FIG. 2B illustrate an exemplary method of segmenting and parameterizing a dataset to generate synthetic data, consistent with disclosed embodiments.
Figure 2A:
Figure 2A:
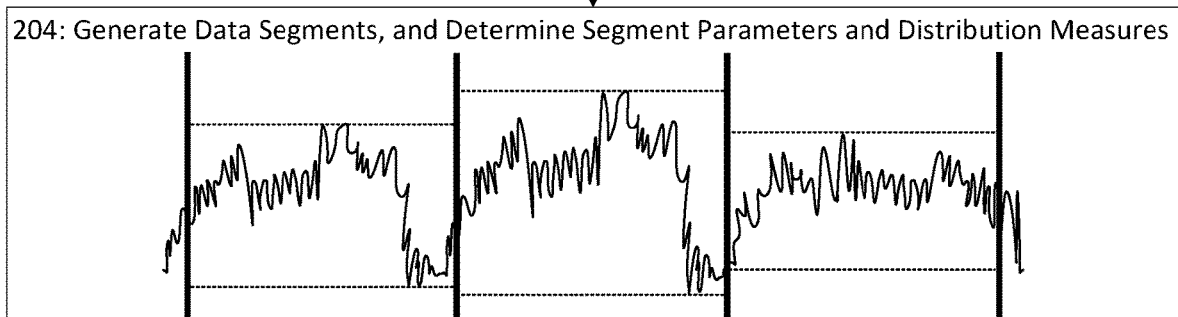
Figure 2A:
Figure 2A:
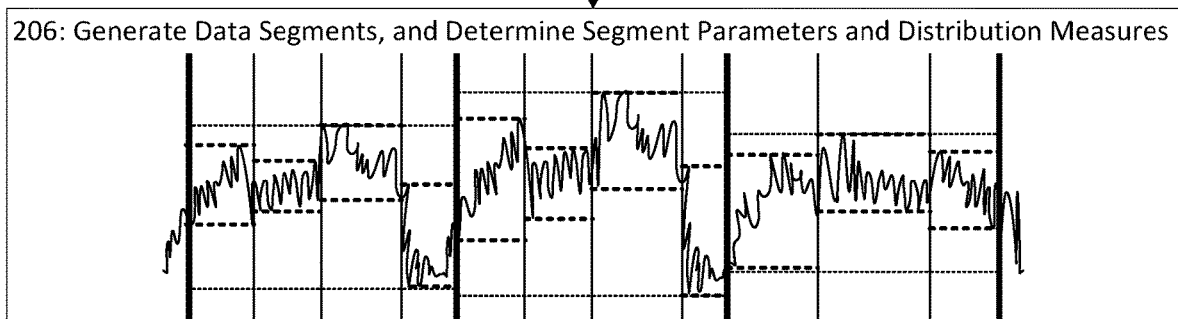
Figure 2A:
Figure 2B:
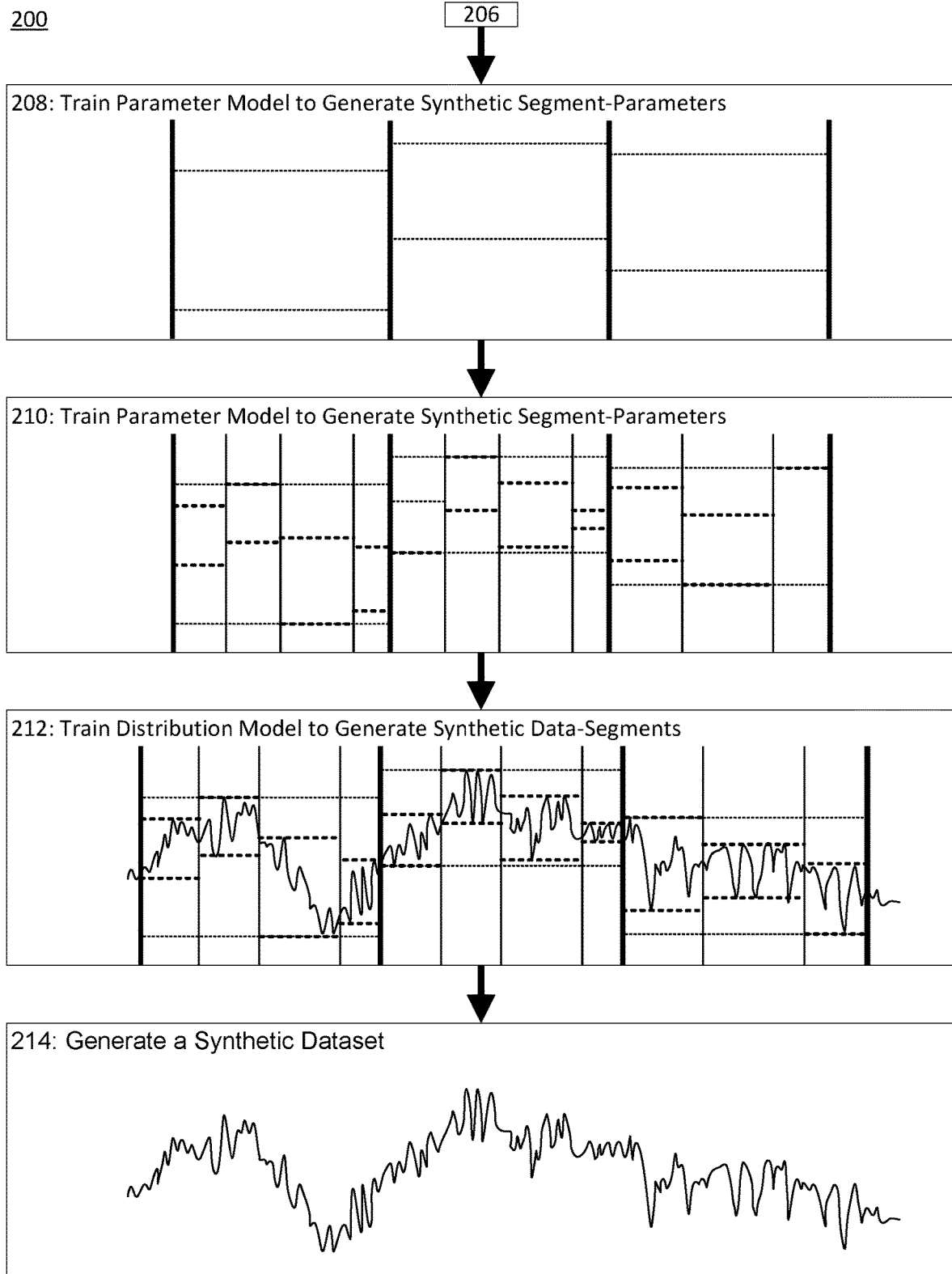

FIG. 2A and FIG. 2B illustrate exemplary method 200 of segmenting a dataset to generate synthetic data, consistent with disclosed embodiments. FIG. 2A and FIG. 2B provide a graphical depiction of phases 202 through 212 of a method to segment a dataset. As shown, a dataset may comprise at least one dimension of time-series data, with time graphed on a horizontal axis and the value of the time-series data on a vertical axis. In the method 200, a dataset may include environmental data, financial data, energy data, water data, health data, and/or any other type of data.

FIG. 2A and FIG. 2B are provided for purposes of illustration only and are not intended to be limiting on the embodiments. As one of skill in the art will appreciate, embodiments may include methods of segmenting a dataset which differ from exemplary method 200. For example, datasets of the embodiments may include more than one dimension of time-series data and methods may include segmenting multiple dimensions of a dataset. In addition, time-series data of embodiments consistent with the present disclosure may have statistical properties which differ from those depicted in FIG. 2A and FIG. 2B.

At phase 202, synthetic-data system 102 may receive a dataset comprising time-series data, consistent with disclosed embodiments. In some embodiments, synthetic data-generating system 102 may receive a dataset from another component of system 100 (e.g., client device 110) and/or a computing component outside system 100 (e.g., via interface 322 (described in further detail below)). In some embodiments, receiving a dataset includes retrieving a dataset from a data storage (e.g., from data 331 (described in further detail below), dataset database 106, and/or remote database 108).

At phase 204, synthetic-data system 102 may generate data segments of a dataset, determine segment parameters, and/or determine distribution measures, consistent with disclosed embodiments. By way of example, at phase 204, synthetic-data system 102 may generate three data segments from a dataset as illustrated by vertical dividing lines. Consistent with disclosed embodiments, phase 204 may include generating any number of data segments from a dataset, for example thousands, millions, or even more data segments (not depicted).

In some embodiments, the size (i.e., length in the time dimension) of data segments may be based on a predetermined segment size. In some embodiments, synthetic-data system 102 may determine a segment size at step 204 based on a statistical metric of a dataset. For example, synthetic-data system 102 may determine that a dataset exhibits periodic (e.g., cyclic) behavior and segment the dataset based on a period of the dataset. Synthetic-data system 102 may implement univariate or multivariate statistical method to determine a period of a dataset. Synthetic-data system 102 may implement a transform method (e.g., Fourier Transform), check for repeating digits (e.g., integers), or other method of determining a period of a dataset. In some embodiments, synthetic-data system 102 trains or implements a machine learning model to determine a data segment size (e.g., as disclosed in reference to FIG. 7).

Phase 204 may include generating data segments of equal segment size (i.e., equal length in the time dimension). In some embodiments, phase 204 may include generating data segments of unequal segment size (i.e., unequal length in the time dimension). For example, phase 204 may include generating a plurality of data-segments based on a statistical characteristic of a dataset (e.g., identifying data regions with local minima and maxima, and segmenting data according to the local minima and maxima). Phase 204 may include training a machine learning model to determine segment size of a data segment, consistent with disclosed embodiments.

Phase 204 may include determining segment parameters of one or more data segments, consistent with disclosed embodiments. As illustrated by horizontal dashed lines in FIG. 2A, segment parameters may include a minimum and a maximum of a data segment. In some embodiments, phase 204 may include determining a minimum, a maximum, a median, an average, a start value, an end value, a variance, a standard deviation, and/or any other segment parameter. In some embodiments, phase 204 may include determining a sequence of parameters corresponding to a plurality of data segments.

Phase 204 may include determining distribution measures of one or more data segments, consistent with disclosed embodiments. In some embodiments, a distribution measure may include a moment of one or more data segments (e.g., a mean, a variance or standard deviation, a skewness, a kurtosis, etc.). In some embodiments, determining a distribution measure may be associated with a normalized distribution, a gaussian distribution, a Bernoulli distribution, a binomial distribution, a normal distribution, a Poisson distribution, an exponential distribution, and/or any other data distribution. In some embodiments, a distribution measure may include a regression result of a time-dependent function applied to one or more data segments (e.g., a linear function or exponential growth function). The regression result may include a slope, an exponential factor, a goodness of fit measure (e.g., an R-squared value), or the like.

At phase 206, synthetic-data system 102 may generate data segments of a dataset, determine segment parameters, and/or determine distribution measures, consistent with disclosed embodiments. In some embodiments, synthetic-data system 102 may recursively generate data-segments at phase 206 within previously generated data segments (i.e., for a smaller time scale). As shown by way of example in FIG. 2, phase 206 may include subdividing data segments generated in phase 204 (located between thick vertical lines) into smaller data segments (located between thin vertical lines). For example, a dataset may include time-series temperature data, and phase 204 may represent segmenting the dataset into data-segments corresponding to monthly time intervals (i.e., the segment size may be one-month), while phase 206 may include generating data segments corresponding to weekly or daily time intervals.

Phase 206 may include determining segment parameters, consistent with disclosed embodiments. Phase 206 may include determining distribution measures, consistent with disclosed embodiments.

As one of skill in the art will appreciate, phase 206 may performed recursively any number of times at various time scales. That is, phase 206 may include repeatedly subdividing previously generated data segments, determining segment parameters of the subdivisions, and determining distribution measures of the subdivisions, consistent with disclosed embodiments. For example, phase 206 may include generating sequences of data segments corresponding to monthly, weekly, daily, and hourly data segments.

At phase 208, synthetic-data system 102 may train a parameter model to generate synthetic segment-parameters, consistent with disclosed embodiments. At phase 208, FIG. 2B illustrates synthetic segment-parameters generated by a parameter model. By way of example, horizontal lines representing minimum and maximum values are represented in the figure. A parameter model may include a machine learning model, consistent with disclosed embodiments. In some embodiments, synthetic-data system 102 may train a parameter model to generate synthetic segment-parameters based on segment parameters determined in phase 204.

Model training in phase 208 may include training a parameter model based on a performance metric (e.g., a performance score). A performance metric may include a similarity metric of synthetic segment-parameters and segment parameters. For example, a similarity metric may include determining whether, within a tolerance, a statistical metric of synthetic segment-parameters match a statistical metric of segment-parameters. In some embodiments, the similarity metric may include a comparison of an autocorrelation of segment parameters to an autocorrelation of synthetic segment-parameters, a comparison of a distribution of segment parameters to a distribution of synthetic segment-parameters, a comparison of a covariance of segment parameters to a covariance of synthetic segment-parameters, a comparison of an average of synthetic segment-parameters to an average of segment parameters, and/or any other comparison of a statistical metric of synthetic segment-parameters to a statistical metric of segment parameters.

At phase 210, synthetic-data system 102 may train a parameter model to generate synthetic segment-parameters, consistent with disclosed embodiments. As shown, phase 210 may include generating synthetic-data segment parameters within previously generated segment parameters (i.e., recursive synthetic data-segments). The parameter model of phase 210 may be the same parameter model of phase 208 or a different parameter model. In some embodiments, training at phase 210 may be based on data segments generated during phase 206. For example, synthetic data system 102 may trained a parameter model to generate synthetic monthly time-series data at phase 208 and may train the same or a different parameter model to generate synthetic daily monthly time-series data at phase 210.

At phase 212, synthetic-data system 102 may train a distribution model to generate synthetic data-segments based on synthetic segment-parameters, consistent with disclosed embodiments. Phase 212 may include training one or more distribution models to generate synthetic data-segments based on the synthetic segment-parameters of phase 208 and/or synthetic segment-parameters of phase 210. In some embodiments, phase 212 includes training a distribution model to accept synthetic parameters as inputs and generate synthetic data-segments that meet a performance metric. A performance metric may be based on a similarity metric of a data segment to a synthetic data segment generated by a distribution model. A similarity metric at phase 212 may be based on a comparison of synthetic distribution-measures of phase 212 to distribution measures of phase 204 or 206. A performance metric may be based on a statistical metric of a data segment and/or a synthetic data segment. For example, a performance metric may be based on a correlation (e.g., an autocorrelation or a correlation of data in two or more dimensions of a data segment).

At phase 214, synthetic-data system 102 may generate a synthetic dataset, consistent with disclosed embodiments. In some embodiments, phase 214 may include performing steps of process 500 (described in further detail below), consistent with disclosed embodiments. In some embodiments, generating a synthetic dataset at phase 214 includes generating a sequence of synthetic segment parameters via the parameter model. In some embodiments, generating a synthetic dataset at phase 214 may include generating, via a distribution model, a sequence of synthetic data-segment based on synthetic segment parameters. In some embodiments, generating a synthetic dataset at phase 214 may include combining synthetic data-segments (e.g., combining in two or more dimensions, appending and/or prepending data).

Figure 3:
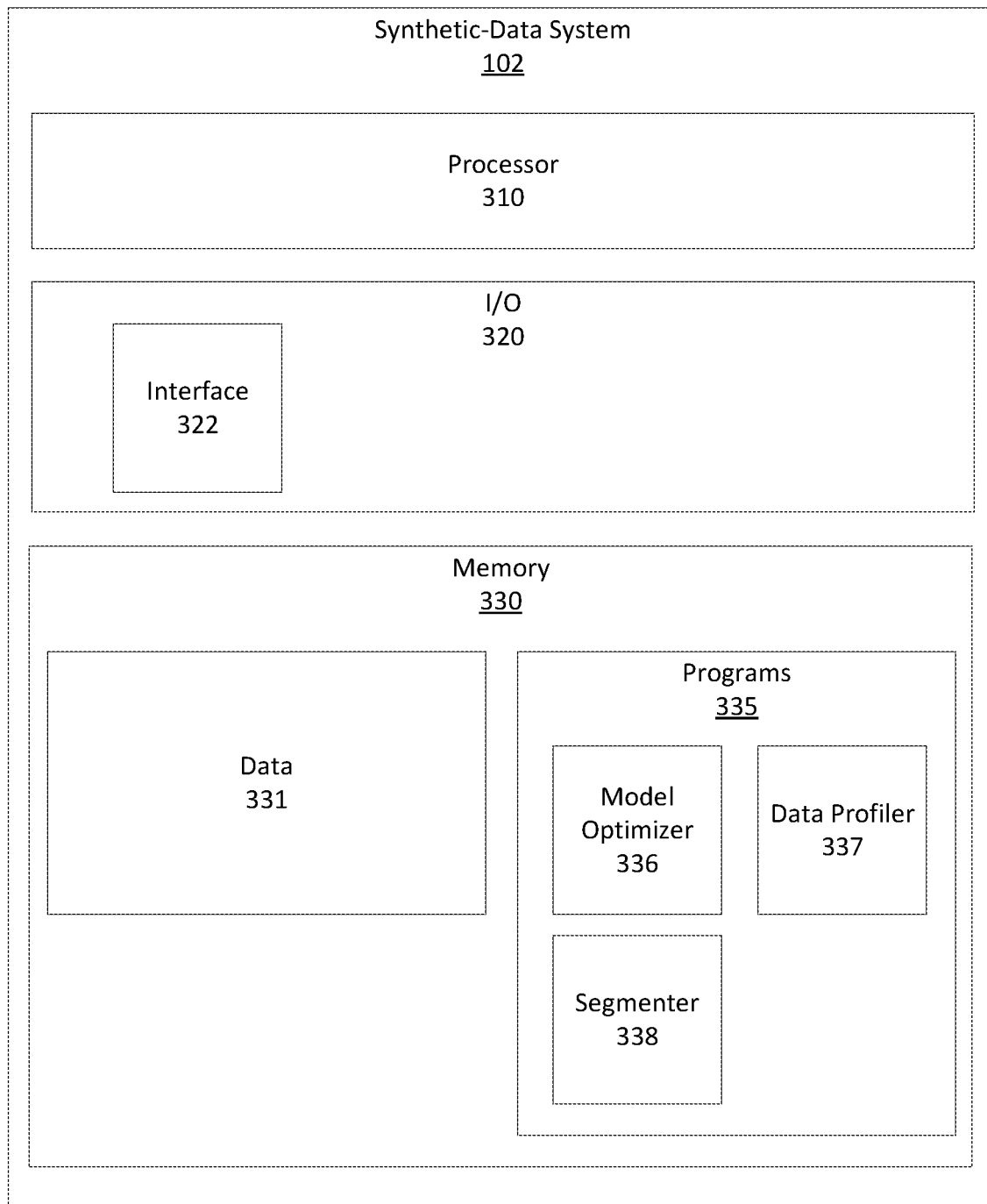
FIG. 3 depicts an exemplary synthetic-data system, consistent with disclosed embodiments.

FIG. 3 depicts exemplary synthetic-data system 102, consistent with disclosed embodiments. Synthetic-data system 102 may include a computing device, a computer, a server, a server cluster, a plurality of clusters, and/or a cloud service, consistent with disclosed embodiments. As shown, synthetic-data system 102 may include one or more processors 310, one or more I/O devices 320, and one or more memory units 330. In some embodiments, some or all components of synthetic-data system 102 may be hosted on a device, a computer, a server, a cluster of servers, or a cloud service. In some embodiments, synthetic-data system 102 may be a scalable system configured to efficiently manage resources and enhance security by provisioning computing resources in response to triggering events and terminating resources after completing a task (e.g., a scalable cloud service that spins up and terminates container instances).

FIG. 3 depicts an exemplary configuration of synthetic-data system 102. As will be appreciated by one skilled in the art, the components and arrangement of components included in synthetic-data system 102 may vary. For example, as compared to the depiction in FIG. 3, synthetic-data system 102 may include a larger or smaller number of processors, I/O devices, or memory units. In addition, synthetic-data system 102 may further include other components or devices not depicted that perform or assist in the performance of one or more processes consistent with the disclosed embodiments. The components and arrangements shown in FIG. 3 are not intended to limit the disclosed embodiments, as the components used to implement the disclosed processes and features may vary.

Processor 310 may comprise known computing processors, including a microprocessor. Processor 310 may constitute a single-core or multiple-core processor that executes parallel processes simultaneously. For example, processor 310 may be a single-core processor configured with virtual processing technologies. In some embodiments, processor 310 may use logical processors to simultaneously execute and control multiple processes. Processor 310 may implement virtual machine technologies, or other known technologies to provide the ability to execute, control, run, manipulate, store, etc., multiple software processes, applications, programs, etc. In another embodiment, processor 310 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 310 may execute various instructions stored in memory 330 to perform various functions of the disclosed embodiments described in greater detail below. Processor 310 may be configured to execute functions written in one or more known programming languages.

I/O devices 320 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 320 may be components of an interface 322 (e.g., a user interface).

Interface 322 may be configured to manage interactions between system 100 and other systems using network 112. In some aspects, interface 322 may be configured to publish data received from other components of system 100. This data may be published in a publication and subscription framework (e.g., using APACHE KAFKA), through a network socket, in response to queries from other systems, or using other known methods. Data may be synthetic data, as described herein. As an additional example, interface 322 may be configured to provide information received from other components of system 100 regarding datasets. In various aspects, interface 322 may be configured to provide data or instructions received from other systems to components of system 100. For example, interface 322 may be configured to receive instructions for generating data models (e.g., type of data model, data model parameters, training data indicators, training parameters, or the like) from another system and provide this information to programs 335. As an additional example, interface 322 may be configured to receive data including sensitive data from another system (e.g., in a file, a message in a publication and subscription framework, a network socket, or the like) and provide that data to programs 335 or store that data in, for example, data 331, dataset database 106, and/or remote database 108.

In some embodiments, interface 322 may include a user interface configured to receive user inputs and provide data to a user (e.g., a data manager). For example, interface 322 may include a display, a microphone, a speaker, a keyboard, a mouse, a track pad, a button, a dial, a knob, a printer, a light, an LED, a haptic feedback device, a touchscreen and/or other input or output devices.

Memory 330 may be a volatile or non-volatile, magnetic, semiconductor, optical, removable, non-removable, or other type of storage device or tangible (i.e., non-transitory) computer-readable medium, consistent with disclosed embodiments. As shown, memory 330 may include data 331, including one of at least one of encrypted data or unencrypted data. Consistent with disclosed embodiments, data 331 may include datasets, model data (e.g., model parameters, training criteria, performance metrics, etc.), and/or other data.

Programs 335 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 335 may be written in one or more programming or scripting languages. One or more of such software sections or modules of memory 330 may be integrated into a computer system, non-transitory computer-readable media, or existing communications software. Programs 335 may also be implemented or replicated as firmware or circuit logic.

Programs 335 may include a model optimizer 336, a data profiler 337, a segmenter 338, and/or other components (e.g., modules) not depicted to perform methods of the disclosed embodiments. In some embodiments, modules of programs 335 may be configured to generate ("spin up") one or more ephemeral container instances (e.g., an AMAZON LAMBDA instance) to perform a task and/or to assign a task to a running (warm) container instance, consistent with disclosed embodiments. Modules of programs 335 may be configured to receive, retrieve, and/or generate models, consistent with disclosed embodiments. Modules of programs 335 may be configured to perform operations in coordination with one another. In some embodiments, programs 335 may be configured to conduct an authentication process, consistent with disclosed embodiments.

Model optimizer 336 may include programs (scripts, functions, algorithms) to train, implement, store, receive, retrieve, and/or transmit one or more machine-learning models. Machine-learning models may include a neural network model, an attention network model, a generative adversarial model (GAN), a recurrent neural network (RNN) model, a deep learning model (e.g., a long short-term memory (LSTM) model), a random forest model, a convolutional neural network (CNN) model, an RNN-CNN model, a temporal-CNN model, a support vector machine (SVM) model, a natural-language model, and/or another machine-learning model. Models may include an ensemble model (i.e., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. Model optimizer 336 may be configured to adjust model parameters during training. Model parameters may include weights, coefficients, offsets, or the like. Training may be supervised or unsupervised.

Model optimizer 336 may be configured to train machine learning models by optimizing model parameters and/or hyperparameters (hyperparameter tuning) using an optimization technique, consistent with disclosed embodiments. Hyperparameters may include training hyperparameters, which may affect how training of a model occurs, or architectural hyperparameters, which may affect the structure of a model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. Model optimizer 336 may be configured to optimize statistical models using known optimization techniques.

In some embodiments, model optimizer 336 may be configured to generate models based on instructions received from another component of system 100 and/or a computing component outside system 100 (e.g., via interface 322, from client device 110, etc.). For example, model optimizer 336 may be configured to receive a visual (graphical) depiction of a machine learning model and parse that graphical depiction into instructions for creating and training a corresponding neural network. Model optimizer 336 may be configured to select model training parameters. This selection may be based on model performance feedback received from another component of system 100. Model optimizer 336 may be configured to provide trained models and descriptive information concerning the trained models to model storage 104.

Model optimizer 336 may be configured to train data models to generate synthetic data based on an input dataset (e.g., a dataset comprising actual data). For example, model optimizer 336 may be configured to train data models to generate synthetic data by identifying and replacing sensitive information in a dataset. In some embodiments, model optimizer 336 may be configured to train data models to generate synthetic data based on a data profile (e.g., a data schema and/or a statistical profile of a dataset). For example, model optimizer 336 may be configured to train data models to generate synthetic data to satisfy a performance metric. A performance metric may be based on a similarity metric representing a measure of similarity between a synthetic dataset and another dataset.

Model optimizer 336 may be configured to maintain a searchable model index (e.g., a B-Tree or other index). The index may be based on model characteristics (e.g., model type, model parameters, model hyperparameters). The index may be stored in, for example, data 331 or model storage 104.

Data profiler 337 may include programs configured to retrieve, store, and/or analyze properties of data models and datasets. For example, data profiler 337 may include or be configured to implement one or more data-profiling models. A data-profiling model may include machine-learning models and statistical models to determine a data schema and/or a statistical profile of a dataset (i.e., to profile a dataset), consistent with disclosed embodiments. A data-profiling model may include an RNN model, a CNN model, or other machine-learning model.

In some embodiments, data profiler 337 may include algorithms to determine a data type, key-value pairs, row-column data structure, statistical distributions of information such as keys or values, or other property of a data schema may be configured to return a statistical profile of a dataset (e.g., using a data-profiling model). In some embodiments, data profiler 337 may be configured to implement univariate and multivariate statistical methods. Data profiler 337 may include a regression model, a Bayesian model, a statistical model, a linear discriminant analysis model, or other classification model configured to determine one or more descriptive metrics of a dataset. For example, data profiler 337 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

In some embodiments, data profiler 337 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, data profiler 337 may be configured to generate a similarity metric representing a measure of similarity between data in a dataset. A similarity metric may be based on a correlation, covariance matrix, a variance, a frequency of overlapping values, or other measure of statistical similarity.

In some embodiments, data profiler 337 may be configured to classify a dataset. Classifying a dataset may include determining whether a data-set is related to another datasets. Classifying a dataset may include clustering datasets and generating information indicating whether a dataset belongs to a cluster of datasets. In some embodiments, classifying a dataset may include generating data describing a dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as a node diagram, a tree diagram, or a vector diagram of datasets. Classifying a dataset may include estimating a likelihood that a dataset relates to another dataset, the likelihood being based on the similarity metric.

Data profiler 337 may be configured to classify a dataset based on data-model output, consistent with disclosed embodiments. For example, data profiler 337 may be configured to classify a dataset based on a statistical profile of a distribution of activation function values. In some embodiments, data profiler 337 may be configured to classify a dataset at least one of an edge, a foreign key, a data schema, or a similarity metric, consistent with disclosed embodiments. In some embodiments, the similarity metric may represent a statistical similarity between data-model output of a first dataset and a second dataset, consistent with disclosed embodiments. As another example, data classification module may classify a dataset as a related dataset based on determination that a similarity metric between a dataset and a previously classified dataset satisfies a criterion.

Data profiler 337 m may be configured to maintain a searchable dataset index (e.g, a B-Tree or other index). The index may be based on data profiles. The index may be stored in, for example, data 331 or dataset database 106.

Segmenter 338 may be configured to generate data segments, determine segment parameters, generate synthetic segment-parameters, determine a distribution measure of a data segment, and/or generate synthetic data-segments, consistent with disclosed embodiments. Segmenter 338 may be configured to generate a plurality of data segments based on a dataset. In some embodiments, generating a data segment may be based on a segment size (e.g., a length of time). A segment size may be a pre-determined segment size (e.g., monthly segments). In some embodiments, segmenter 338 may be configured to determine a segment size on a statistical metric of a dataset. For example, segmenter 338 may be configured to determine that a dataset exhibits periodic behavior and segment the dataset based on a period of the dataset. Segmenter 338 may be configured to implement univariate or multivariate statistical method to determine a period of a dataset. Segmenter 338 may be configured to implement a transform method (e.g., Fourier Transform), check for repeating digits (e.g., integers), or other method of determining a period of a dataset. In some embodiments, segmenter 338 may be configured to train or implement a machine learning model to determine a data segment size, consistent with disclosed embodiments. In some embodiments, the segment sizes of consecutive segment may be non-uniform. For example, the segment sizes of two-neighboring data segments may differ from each other.

Segmenter 338 may be configured to determine segment parameters (i.e. parameters of data segments) including a minimum, a maximum, a median, an average, a start value, an end value, a variance, a standard deviation, and/or any other segment parameter. Segmenter 338 may be configured to implement any known statistical method to determine a segment parameter.

Segmenter 338 may be configured to generate synthetic segment-parameters based on segment parameters (i.e., using segment parameters as training data), consistent with disclosed embodiments. In some embodiments, segmenter 338 may be configured to generate, retrieve, train, and/or implement a parameter model, consistent with disclosed embodiments. For example, segmenter 338 may be configured to train a parameter model in coordination with model optimizer 336 and/or may be configured to send commands to model optimizer 336 to train a parameter model. A parameter model may include a machine learning model configured to generate synthetic segment-parameters based on segment parameters. For example, a parameter model may be configured to generate a sequence of synthetic minimum values of data segments and a sequence of synthetic maximum values of data segments. A parameter model may include a recurrent neural network model, a long short-term memory model, or any other machine learning model.

In some embodiments, segmenter 338 may be configured to train a parameter model to generate a sequence of any number of synthetic data parameters going forwards or backwards in time from an initial starting point. In some embodiments, segmenter 338 may be configured to train a parameter model to generate a plurality of synthetic segment-parameters based on a segment-parameter seed (e.g., a random seed or a segment parameter).

Segmenter 338 may be configured to train a parameter model based on a performance metric. The performance metric may include a similarity metric of synthetic segment-parameters and segment-parameters. For example, a similarity metric may include determining whether, within a tolerance, a statistical metric of synthetic segment-parameters match a statistical metric of segment-parameters. In some embodiments, the similarity metric may include a comparison of an autocorrelation of segment parameters to an autocorrelation of synthetic segment-parameters, a comparison of a distribution of segment parameters to a distribution of synthetic segment-parameters, a comparison of a covariance of segment parameters to a covariance of synthetic segment-parameters, a comparison of an average of synthetic segment-parameters to an average of segment parameters, and/or any other comparison of a statistical metric of synthetic segment-parameters to a statistical metric of segment parameters.

Segmenter 338 may be configured to determine a distribution measure of a data segment, consistent with disclosed embodiments. For example, segmenter 338 may be configured to a distribution measure may include distribution parameters of a distribution that fits to a data segment. For example, segmenter 338 may be configured to generate goodness of fit measures for a plurality of candidate distributions and distribution measures based on to one or more data segments. In some embodiments, a distribution measure includes a moment of one or more data segments (e.g., a mean, a variance or standard deviation, a skewness, a kurtosis, etc.). In some embodiments, segmenter 338 may be configured to determine distribution measures associated with a normalized distribution, a gaussian distribution, a Bernoulli distribution, a binomial distribution, a normal distribution, a Poisson distribution, an exponential distribution, and/or any other data distribution. In some embodiments, a distribution measure may include a regression result of a time-dependent function applied to one or more data segments (e.g., a linear function or exponential growth function). The regression result may include a slope, an exponential factor, a goodness of fit measure (e.g., an R-squared value), or the like.

Segmenter 338 may be configured to train a distribution model to generate a synthetic data segment, consistent with disclosed embodiments. A distribution model may include a multilayer perceptron model, a convolutional neural network model, a sequence-to-sequence model, and/or any other machine learning model. For example, segmenter 338 may be configured to train a distribution model in coordination with model optimizer 336 and/or may be configured to send commands to model optimizer 336 to train a distribution model. In some embodiments, segmenter 338 may be configured to train a distribution model to generate a synthetic data segment based on one or more distribution measures and one or more segment parameters. For example, segmenter 338 may be configured to train a distribution model to generate synthetic segment data that falls within a "bounding box" defined by a set of segment parameters (i.e., within a minimum value, a maximum value, a start value, and an end value). As an additional or alternate example, segmenter 338 may be configured to train a distribution model to generate synthetic segment-data that matches an average specified by a segment-parameter. In some embodiments, segmenter 338 may be configured to train a distribution model to accept one or more segment parameters inputs and return synthetic segment data output. For example, segmenter 338 may train a distribution model to accept a sequence of synthetic-segment parameters of a sequence of synthetic data segments.

Segmenter 338 may be configured to train a distribution model based on a performance metric, consistent with disclosed embodiments. A performance metric may be based on a similarity metric of a data segment to a synthetic data segment generated by a distribution model. A performance metric may be based on a statistical metric of a data segment and/or a synthetic data segment. For example, a performance metric may be based on a correlation (e.g., an autocorrelation or a correlation of data in two or more dimensions of a data segment).

Segmenter 338 may be configured to generate a synthetic dataset by combining one or more synthetic data-segments. For example, segmenter 338 may be configured to append and/or prepend synthetic data-segments to generate a synthetic dataset. Segmenter 338 may be configured to combine data segments into a multidimensional synthetic dataset. For example, segmenter may be configured to combine a sequence of data segments comprising stock values with a sequence of data segments comprising employment data.

Figure 4:
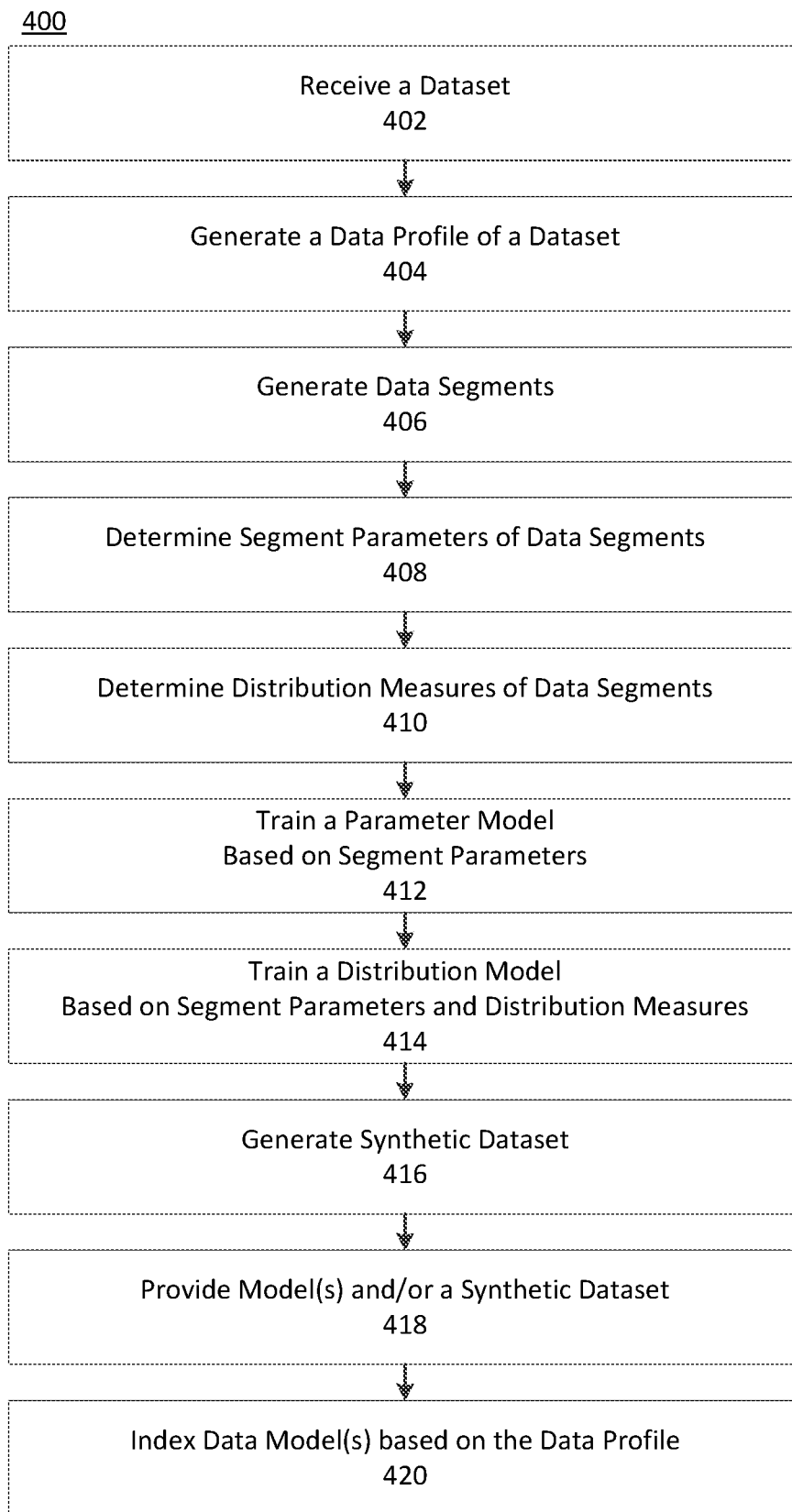
FIG. 4 depicts an exemplary process for training a parameter model and a distribution model, consistent with disclosed embodiments.

FIG. 4 depicts an exemplary process 400 for training a parameter model and a distribution model, consistent with disclosed embodiments. In some embodiments, synthetic-data system 102 may perform process 400 using programs 335. One or more of model optimizer 336, data profiler 337, segmenter 338, and/or other components of programs 335 may perform operations of process 400, consistent with disclosed embodiments. It should be noted that other components of system 100, including, for example, client device 110 may perform operations of one or more steps of process 400.

Consistent with disclosed embodiments, steps of process 400 may be performed on one or more cloud services using one or more ephemeral container instances (e.g., AMAZON LAMBDA). For example, at any of the steps of process 400, synthetic-data system 102 may generate (spin up) an ephemeral container instance to execute a task, assign a task to an already-running ephemeral container instance (warm container instance), or terminate a container instance upon completion of a task. As one of skill in the art will appreciate, steps of process 400 may be performed as part of an application interface (API) call.

At step 402, synthetic-data system 102 may receive one or more sample datasets, consistent with disclosed embodiments. In some embodiments, step 402 may include receiving a dataset from data 331, one or more client devices (e.g., client device 110), dataset database 106, remote database 108, and/or a computing component outside system 100. Step 402 may include retrieving a dataset from a data storage (e.g., from data 331, dataset database 106, and/or remote database 108). A dataset of step 402 may include any of the types of datasets previously described or any other type of dataset. A dataset of step 402 may have a range of dimensions, formats, data schema, and/or statistical profiles. A dataset of step 402 may include time-series data.

At step 404, synthetic-data system 102, may generate a data profile of a dataset, consistent with disclosed embodiments. For example, step 404 may include implementing a data profiling model as previously described (e.g., in reference to data profiler 337) or any other methods of generating a data profile.

At step 406, synthetic-data system 102 may generate data segments of a dataset, consistent with disclosed embodiments. Generating data segments may include generating segments according to one or more segment sizes. A segment size may be predetermined. A segment size may be determined by a model based on a statistical property of a data segment, consistent with disclosed embodiments. Generating data segments may include performing any of the methods to generate data segments as previously described (e.g., in reference to segmenter 338) or any other methods of segmenting data.

At step 408, synthetic-data system 102, may determine segment parameters of data segments, consistent with disclosed embodiments. Segment parameters at step 408 may include any segment parameters as previously described (e.g., in reference to segmenter 338) or any other segment parameters. For example, segment parameters may include "bounding box" parameters (i.e., a minimum, a maximum, a start value, and an end value).

At step 410, synthetic-data system 102 may determine distribution measures of data segments, consistent with disclosed embodiments. The distribution measures may include any distribution measures as previously described (e.g., in reference to segmenter 338) or any other distribution measures. For example, distribution measures may include a sequence of means of corresponding to a sequence of data segments, consistent with disclosed embodiments.

At step 412, synthetic-data system 102 may train a parameter model to generate synthetic segment-parameters, the training being based on segment parameters, consistent with disclosed embodiments. For example, the parameter model may be trained based on a performance metric as previously described in reference to segmenter 338. In some embodiments, training a parameter model at step 412 may include performing steps of process 700 (described in further detail below).

At step 414, synthetic-data system 102 may train a distribution model to generate synthetic data-segments based on segment parameters and distribution measures, consistent with disclosed embodiments. For example, the distribution model may be trained based on a performance metric as previously described in reference to segmenter 338. In some embodiments, training a distribution model at step 414 includes performing steps of process 600 (described in further detail below).

At step 416, synthetic-data system 102 may generate a synthetic dataset using a parameter model and a distribution model, consistent with disclosed embodiments. In some embodiments, step 416 may include performing steps of process 500 (described in further detail below), consistent with disclosed embodiments. In some embodiments, generating a synthetic dataset at step 416 may include generating a sequence of synthetic segment parameters via the parameter model. In some embodiments, generating a synthetic dataset at step 416 may include generating, via the distribution model, a sequence of synthetic data-segments based on synthetic segment parameters.

At step 418, synthetic-data system 102 may provide a parameter model, a distribution model, and/or a synthetic dataset consistent with disclosed embodiments. Providing a model or dataset at step 418 may include storing the model or dataset (e.g., in data 331, model storage 104, dataset database 106, and/or remote database 108). Providing a model or dataset may include transmitting the model or dataset to a component of system 100, transmitting the model or dataset to a computing component outside system 100 (e.g., via network 112), and/or displaying the model or dataset (e.g., at interface 322 of I/O 320).

At step 420, synthetic-data system 102 may index a parameter model and/or a distribution model, consistent with disclosed embodiments. Indexing a model may be based on a model type or a characteristic of a model (e.g., a parameter and/or a hyperparameter). Indexing model may include generating, retrieving, and/or updating a model index (e.g., a model index stored in model storage 104 or data 331).

FIG. 5 depicts exemplary process 500 for generating synthetic data, consistent with disclosed embodiments. In some embodiments, synthetic-data system 102 may perform process 500 using programs 335. One or more of model optimizer 336, data profiler 337, segmenter 338, and/or other components of programs 335 may perform operations of process 500, consistent with disclosed embodiments. It should be noted that other components of system 100, including, for example, client device 110 may perform operations of one or more steps of process 500.

Consistent with disclosed embodiments, steps of process 500 may be performed on one or more cloud services using one or more ephemeral container instances (e.g., AMAZON LAMBDA). For example, at any of the steps of process 500, synthetic-data system 102 may generate (spin up) an ephemeral container instance to execute a task, assign a task to an already-running ephemeral container instance (warm container instance), or terminate a container instance upon completion of a task. As one of skill in the art will appreciate, steps of process 500 may be performed as part of an application interface (API) call.

At step 502, synthetic-data system 102 may generate, via a parameter model, synthetic segment-parameters, consistent with disclosed embodiments. For example, a parameter model may generate a sequence of synthetic segment parameters based on a segment-parameter seed or an instruction to generate a random parameter seed. The sequence may extend forward and/or backward in time from the initial segment-parameter seed or random seed. A parameter model of step 502 may include a parameter model previously trained to generate segment parameters (e.g., via process 700 (described in further detail below)).

At step 504, synthetic-data system 102 may generate, via a distribution model, synthetic data-segments based on synthetic segment parameters, consistent with disclosed embodiments. A distribution model of step 504 may include a distribution model previously trained to generate synthetic data segments (e.g., via process 600 (described in further detail below)).

At step 506, synthetic-data system 102 may generate a synthetic dataset by combining synthetic data-segments, consistent with disclosed embodiments. Combining synthetic data-segments may include appending and/or prepending synthetic data segments. Combining synthetic data-segments may include combining synthetic data segments in two or more dimensions, consistent with disclosed embodiments.

Figure 6:
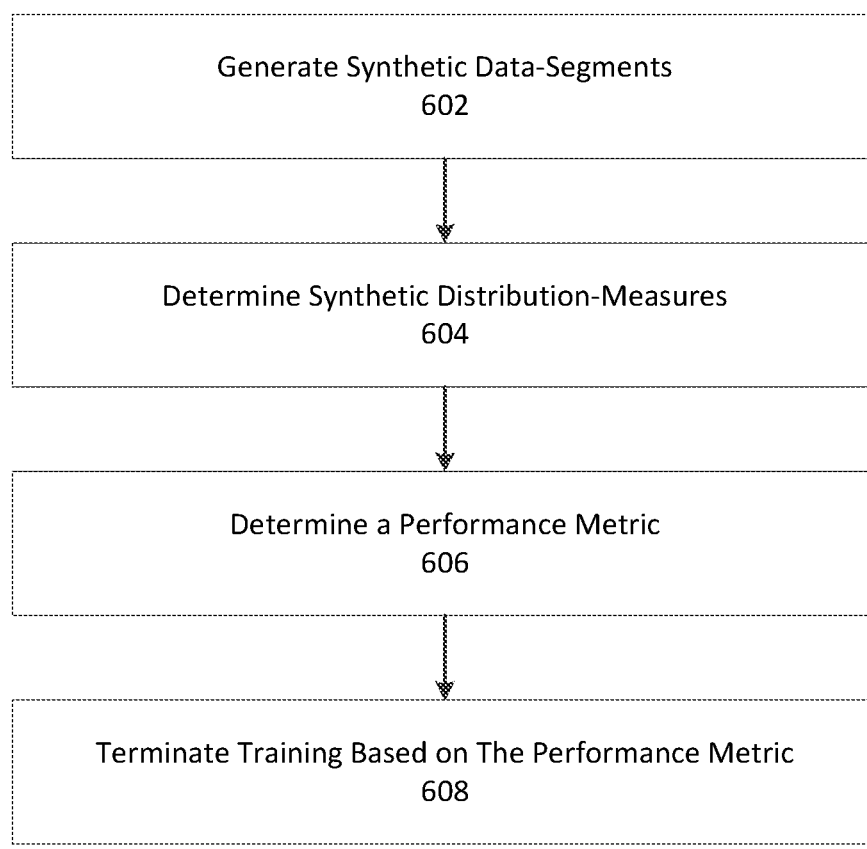
FIG. 6 depicts an exemplary process for training a distribution model, consistent with disclosed embodiments.

FIG. 6 depicts exemplary process 600 for training a distribution model, consistent with disclosed embodiments. In some embodiments, synthetic-data system 102 may perform process 600 using programs 335. One or more of model optimizer 336, data profiler 337, segmenter 338, and/or other components of programs 335 may perform operations of process 600, consistent with disclosed embodiments. It should be noted that other components of system 100, including, for example, client device 110 may perform operations of one or more steps of process 600.

Consistent with disclosed embodiments, steps of process 600 may be performed on one or more cloud services using one or more ephemeral container instances (e.g., AMAZON LAMBDA). For example, at any of the steps of process 600, synthetic-data system 102 may generate (spin up) an ephemeral container instance to execute a task, assign a task to an already-running ephemeral container instance (warm container instance), or terminate a container instance upon completion of a task. As one of skill in the art will appreciate, steps of process 600 may be performed as part of an application interface (API) call.

At step 602, synthetic-data system 102 may generate a synthetic data-segment using a distribution model, consistent with disclosed embodiments. For example, at step 602, synthetic-data system 102 may implement steps of process 500.

At step 604, synthetic-data system 102 may determine synthetic distribution-measures of the synthetic data-segment, consistent with disclosed embodiments. For example, the synthetic distribution-measures may include a moment or a regression result of a time-based function, consistent with disclosed embodiments.

At step 606, synthetic-data system 102 may determine a performance metric of a distribution model, consistent with disclosed embodiments. A performance metric may be based on a similarity metric of a data segment to a synthetic data segment generated by a distribution model at step 604. A similarity metric at step 606 may be based on a comparison of synthetic distribution-measures to distribution measures. A performance metric may be based on a statistical metric of a data segment and/or a synthetic data segment. For example, a performance metric may be based on a correlation (e.g., an autocorrelation or a correlation of data in two or more dimensions of a data segment).

At step 608, synthetic-data system 102 may terminate training of a distribution model based on the performance metric, consistent with disclosed embodiments.

Figure 7:
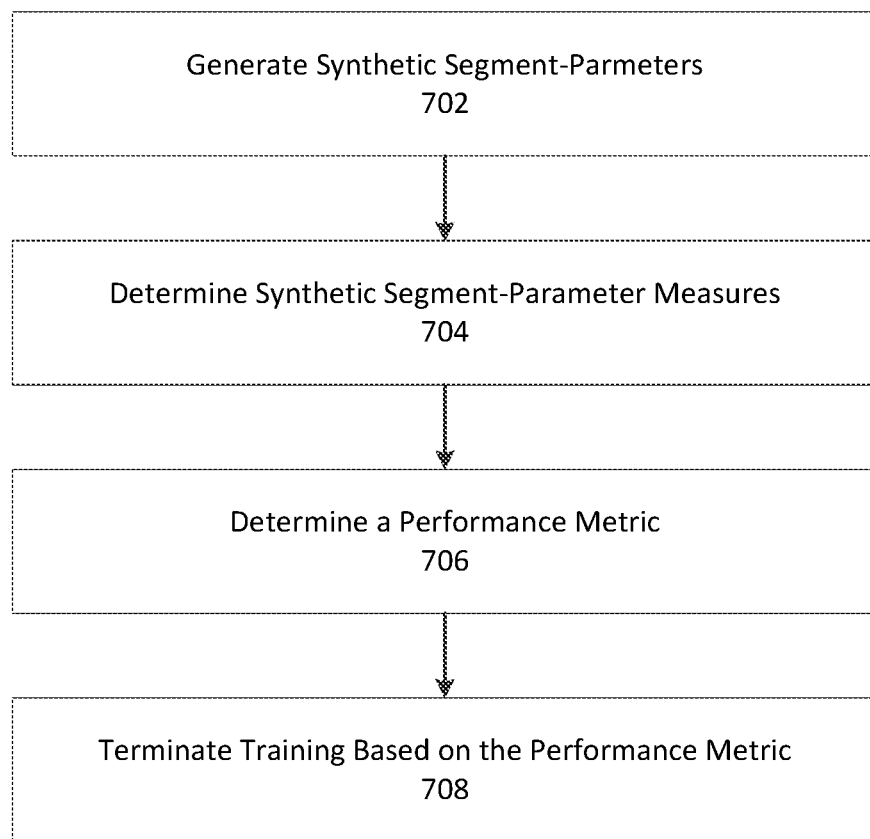
FIG. 7 depicts an exemplary process for training a parameter model, consistent with disclosed embodiments.

FIG. 7 depicts an exemplary process for training a parameter model, consistent with disclosed embodiments. In some embodiments, synthetic-data system 102 may perform process 700 using programs 335. One or more of model optimizer 336, data profiler 337, segmenter 338, and/or other components of programs 335 may perform operations of process 700, consistent with disclosed embodiments. It should be noted that other components of system 100, including, for example, client device 110 may perform operations of one or more steps of process 700.

Consistent with disclosed embodiments, steps of process 700 may be performed on one or more cloud services using one or more ephemeral container instances (e.g., AMAZON LAMBDA). For example, at any of the steps of process 700, synthetic-data system 102 may generate (spin up) an ephemeral container instance to execute a task, assign a task to an already-running ephemeral container instance (warm container instance), or terminate a container instance upon completion of a task. As one of skill in the art will appreciate, steps of process 700 may be performed as part of an application interface (API) call.

At step 702, synthetic-data system 102 may generate synthetic segment parameters, consistent with disclosed embodiments. Generating synthetic segment-parameters may include generating a sequence of synthetic segment parameters based on a segment-parameter seed. A segment-parameter seed may include a random seed. A segment-parameter seed may include a segment parameter (i.e., a segment parameter determined for a data segment of a received dataset).

At step 704, synthetic-data system 102 may determine synthetic-segment-parameter measures (i.e., measures of a synthetic segment-parameter of step 702), consistent with disclosed embodiments. Synthetic-segment-parameter measures may include any statistical measure of a sequence of synthetic segment-parameters. In some embodiments, synthetic-segment-parameter measures may include a moment of the synthetic segment-parameters (e.g., a mean, a variance or standard deviation, a skewness, a kurtosis). In some embodiments, synthetic-segment-parameter measures may include a correlation (e.g., an autocorrelation of the synthetic segment-parameters and/or a correlation between two dimensions of synthetic segment-parameters).

At step 706, synthetic-data system 102 may determine a performance metric, consistent with disclosed embodiments. A performance metric may be based on a similarity metric of a sequence of segment parameters to a sequence of synthetic segment parameters generated by a parameter model at step 704. A performance metric may be based on a statistical metric of a sequence of segment parameters and/or a synthetic segment parameters. For example, a performance metric may be based on a correlation (e.g., an autocorrelation or a correlation of synthetic segment-parameters in two or more dimensions of a data segment). A performance metric may be based on synthetic-segment-parameter measures (e.g., a similarity metric based on a comparison of synthetic-segment-parameter measures to segment-parameter measures).

At step 708, synthetic-data system 102 may terminate training based on the performance metric, consistent with disclosed embodiments.

Figure 8:
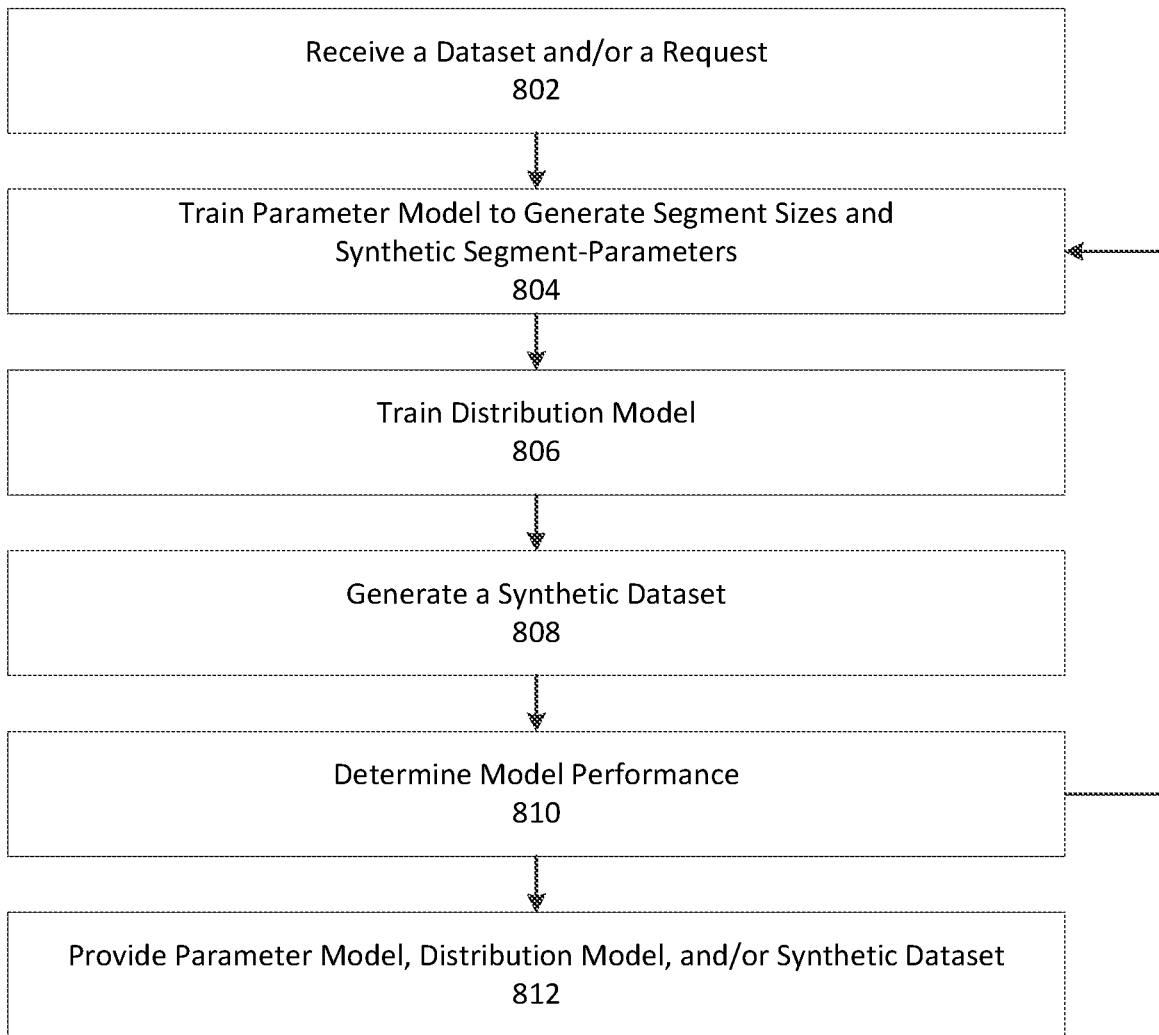
FIG. 8 depicts an exemplary process for recursive training of a parameterizing model and distribution model, consistent with disclosed embodiments.

FIG. 8 depicts exemplary process 800 for recursive training of a parameterizing model and distribution model, consistent with disclosed embodiments. In some embodiments, synthetic-data system 102 may perform process 800 using programs 335. One or more of model optimizer 336, data profiler 337, segmenter 338, and/or other components of programs 335 may perform operations of process 800, consistent with disclosed embodiments. It should be noted that other components of system 100, including, for example, client device 110 may perform operations of one or more steps of process 800.

Consistent with disclosed embodiments, steps of process 800 may be performed on one or more cloud services using one or more ephemeral container instances (e.g., AMAZON LAMBDA). For example, at any of the steps of process 800, synthetic-data system 102 may generate (spin up) an ephemeral container instance to execute a task, assign a task to an already-running ephemeral container instance (warm container instance), or terminate a container instance upon completion of a task. As one of skill in the art will appreciate, steps of process 800 may be performed as part of an application interface (API) call.

At step 802, synthetic-data system 102 may receive a dataset, consistent with disclosed embodiments. In some embodiments, step 802 may include receiving a dataset from data 331, one or more client devices (e.g., client device 110), dataset database 106, remote database 108, and/or a computing component outside system 100. Step 802 may include retrieving a dataset from a data storage (e.g., from data 331, dataset database 106, and/or remote database 108). A dataset of step 802 may include any of the types of datasets previously described or any other type of dataset. A dataset of step 802 may have a range of dimensions, formats, data schema, and/or statistical profiles. A dataset of step 802 may include time-series data.

In some embodiments, step 802 may include receiving a request, consistent with disclosed embodiments. In some embodiments, step 802 may include receiving a request from data 331, one or more client devices (e.g., client device 110), dataset database 106, remote database 108, and/or a computing component outside system 100. The request may include an instruction to generate a synthetic dataset. In some embodiments, the request may include information relating to a data profile of a desired synthetic dataset (e.g., data describing a data schema and/or a statistical metric of a dataset). Information relating to a data profile of the desired synthetic dataset may include a number of dataset dimensions and/or a dataset format. A desired synthetic dataset may include time-series data. In some embodiments, the request specifies a segment size, a segment-parameter seed, an instruction to generate a random initial parameter, a distribution measure, and/or a segment parameter.

At step 804, synthetic-data system 102 may train a parameter model to generate segment sizes and synthetic segment parameters, consistent with disclosed embodiments. For example, step 804 may include optimizing segment sizes based on segment-parameter measures of synthetic segment parameters generated by the parameter model for data segments corresponding to the segment sizes. Segment sizes at step 804 may be non-uniform.

At step 806, synthetic-data system 102 may train a distribution model to generate synthetic data segments based on the synthetic segment-parameters, consistent with disclosed embodiments. In some embodiments, training a distribution model at step 806 may include performing steps of process 700.

At step 808, synthetic-data system 102 may generate a synthetic dataset, consistent with disclosed embodiments. Generating a synthetic dataset may include performing steps of process 500, consistent with disclosed embodiments. In some embodiments, generating a synthetic dataset may be based on a segment-parameter seed (e.g., a random seed or an initial segment-parameter). In some embodiments, a segment-parameter seed or a command to generate a random segment-parameter seed may be received in the request of step 802. Generating a synthetic dataset may include combining data segments, consistent with disclosed embodiments. Combining data segments at step 808 may include appending and/or prepending data segments. Combining data segments at step 808 may include combining data segments in two or more dimensions.

At step 810, synthetic-data system 102 may determine model performance based on the synthetic dataset, consistent with disclosed embodiments. Determining model performance at step 810 may include generating a similarity metric of the synthetic dataset to a dataset (e.g., a dataset received at step 802).

As shown in FIG. 8, steps 804 through 810 may be repeated any number of times. In some embodiments, steps

804 through 810 may be performed recursively. That is, following step 810 synthetic-data system 102 may generate segment sizes and synthetic segment-parameters within a sequence of previously generated synthetic segment-parameters. For example, synthetic-data system 102 may perform steps 804 through 810 a first time to generate first synthetic data segments (e.g., segments that correspond to the segments illustrated in phase 208 of FIG. 2B), and synthetic-data system 102 may perform steps 804 through 810 a first time to generate second synthetic data segments (e.g., segments that correspond to the segments illustrated in phase 210 of FIG. 2B), etc.

At step 812, synthetic-data system 102 may provide a parameter model, a distribution model, and/or a synthetic dataset consistent with disclosed embodiments. Providing a model or dataset at step 812 may include storing the model or dataset (e.g., in data 331, model storage 104, dataset database 106, and/or remote database 108). Providing a model or dataset may include transmitting the model or dataset to a component of system 100, transmitting the model or dataset to a computing component outside system 100 (e.g., via network 112), and/or displaying the model or dataset (e.g., at interface 322 of I/O 320).

Figure 9:
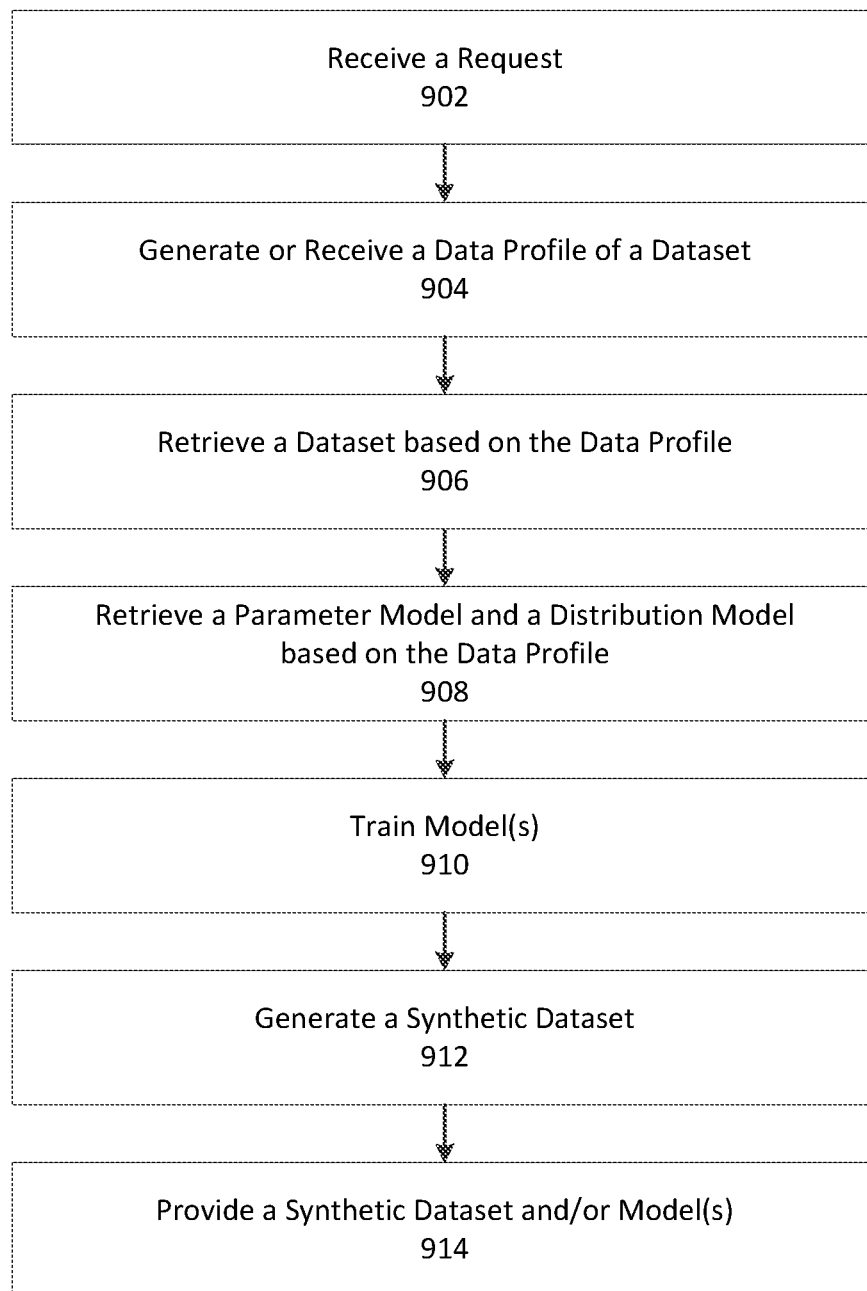
FIG. 9 depicts an exemplary process for generating synthetic data based on a request, consistent with disclosed embodiments.

FIG. 9 depicts exemplary process 900 for generating synthetic data based on a request, consistent with disclosed embodiments. In some embodiments, synthetic-data system 102 may perform process 900 using programs 335. One or more of model optimizer 336, data profiler 337, segmenter 338, and/or other components of programs 335 may perform operations of process 900, consistent with disclosed embodiments. It should be noted that other components of system 100, including, for example, client device 110 may perform operations of one or more steps of process 900.

Consistent with disclosed embodiments, steps of process 900 may be performed on one or more cloud services using one or more ephemeral container instances (e.g., AMAZON LAMBDA). For example, at any of the steps of process 900, synthetic-data system 102 may generate (spin up) an ephemeral container instance to execute a task, assign a task to an already-running ephemeral container instance (warm container instance), or terminate a container instance upon completion of a task. As one of skill in the art will appreciate, steps of process 900 may be performed as part of an application interface (API) call.

At step 902, synthetic-data system 102 may receive a request, consistent with disclosed embodiments. In some embodiments, step 902 may include receiving a request from data 331, one or more client devices (e.g., client device 110), dataset database 106, remote database 108, and/or a computing component outside system 100. The request may include a dataset. The request may include an instruction to generate a synthetic dataset. In some embodiments, the request includes information relating to a data profile of a desired synthetic dataset (e.g., data describing a data schema and/or a statistical metric of a dataset). Information relating to a data profile of the desired synthetic dataset may include a number of dataset dimensions and/or a dataset format. A desired synthetic dataset may include time-series data. In some embodiments, the request specifies a segment size, a segment-parameter seed, an instruction to generate a random initial parameter, a distribution measure, and/or a segment parameter.

At step 904, synthetic-data system 102 may generate or receive a data profile of a dataset based on the request, consistent with disclosed embodiments. For example, the request may comprise a data profile or the storage location of a data profile and step 904 may include receiving a data profile as part of the request or from the storage location. In some embodiments, the request includes a dataset and step 904 includes generating a data profile of the dataset.

At step 906, synthetic-data system 102 may retrieve a dataset based on the data profile, consistent with disclosed embodiments. For example, the request may include a data schema and a statistical metric of a dataset, and step 906 may include searching a dataset index to identify and retrieve a dataset with an overlapping data schema and/or a similar statistical metric (e.g., within a tolerance). Step 906 may include retrieving a dataset from data 331, dataset database 106, remote database 108, or another data storage.

At step 908, synthetic-data system 102 may retrieve a parameter model and a distribution model based on the data profile, consistent with disclosed embodiments. Retrieving a model at step 908 may include retrieving a model from data 331, model storage 104, and/or other data storage. Step 908 may include searching a model index (e.g., an index of model storage 104). Such a search may be based on a model parameter, a model hyperparameter, a model type, and/or any other model characteristic.

At step 910, synthetic-data system 102 may train a parameter model and/or a distribution model, consistent with disclosed embodiments. Training a parameter model and/or distribution model at step 910 may include performing steps of process 600, 700, and/or 800.

At step 912, synthetic-data system 102 may generate a synthetic dataset, consistent with disclosed embodiments. Generating a synthetic dataset may include performing steps of process 500, consistent with disclosed embodiments. In some embodiments, generating a synthetic dataset is based on a segment-parameter seed (e.g., a random seed or an initial segment-parameter). In some embodiments, a segment-parameter seed or a command to generate a random segment-parameter seed may be received at step 902. Generating a synthetic dataset may include combining data segments, consistent with disclosed embodiments.

At step 914, synthetic-data system 102 may provide a synthetic dataset, parameter model, and/or distribution model, consistent with disclosed embodiments. Providing a model or dataset at step 914 may include storing the model or dataset (e.g., in data 331, model storage 104, dataset database 106, and/or remote database 108). Providing a model or dataset may include transmitting the model or dataset to a component of system 100, transmitting the model or dataset to a computing component outside system 100 (e.g., via network 112), and/or displaying the model or dataset (e.g., at interface 322 of I/O 320).

Systems and methods disclosed herein involve unconventional improvements over conventional approaches to synthetic data generation. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for facilitating realistic synthetic time-series data generation via time-scale-based distribution measures, comprising:
   one or more processors and one or more memory units storing instructions that, when executed by the one or more processors, perform operations comprising:
      storing, in a network database, reference time-series data segments comprising reference subsets of reference data segments that respectively correspond to different time scales;
      during training of a machine learning model, executing, via a network, the machine learning model to generate synthetic time-series data segments comprising synthetic subsets of synthetic data segments that respectively correspond to the different time scales;
      with respect to a first time scale of the different time scales, loading, from a network database, a first reference subset of the reference time-series data segments that corresponds to the first time scale in connection with autocorrelation of a first synthetic subset of the synthetic time-series data segments that corresponds to the first time scale; and
      based on a comparison of an autocorrelation of (i) a reference distribution measure associated with the first reference subset of the reference time-series data segments that corresponds to the first time scale and (ii) a synthetic distribution measure associated with the first synthetic subset of the synthetic time-series data segments that corresponds the first time scale, performing (i) updating of the machine learning model in connection with the training of the machine learning model or (ii) termination of the training of the machine learning model.

2. A method for generating synthetic data, the method comprising:
   storing, in one or more databases, reference time-series data segments;
   during training of a machine learning model, executing the machine learning model to generate synthetic time-series data segments;
   with respect to a first time scale, obtaining a first reference subset of the reference time-series data segments that corresponds to the first time scale in connection with autocorrelation of a first synthetic subset of the synthetic time-series data segments that corresponds to the first time scale; and
   based on a comparison of an autocorrelation of (i) a reference distribution measure associated with the first reference subset of the reference time-series data segments and (ii) a synthetic distribution measure associated with the first synthetic subset of the synthetic time-series data segments, performing (i) updating of the machine learning model in connection with the training of the machine learning model or (ii) termination of the training of the machine learning model.

3. The method of claim 2, wherein performing the updating of the machine learning model or the termination of the training of the machine learning model comprises performing the updating of the machine learning model or the termination of the training of the machine learning model based on a given comparison with respect to a regression of a time-based function applied to the first reference subset of the reference time-series data segments and a regression of a time-based function applied to the first synthetic subset of the synthetic time-series data segments.

4. The method of claim 2, wherein performing the updating of the machine learning model or the termination of the training of the machine learning model comprises performing the updating of the machine learning model or the termination of the training of the machine learning model based on a performance metric derived from the comparison.

5. The method of claim 2, wherein performing the updating of the machine learning model or the termination of the training of the machine learning model comprises performing the updating of the machine learning model or the termination of the training of the machine learning model based on a similarity metric derived from the comparison.

6. The method of claim 2, further comprising generating a synthetic dataset by combining sequences of the synthetic time-series data segments.

7. The method of claim 2, wherein the reference distribution measure comprises at least one of a normalized distribution, a gaussian distribution, a Bernoulli distribution, a binomial distribution, a normal distribution, a Poisson distribution, or an exponential distribution.

8. The method of claim 2, wherein generating the synthetic time-series data segments comprises, during the training of the machine learning model, executing the machine learning model to generate (i) first synthetic time-series data segments that corresponds to the first time scale and (ii) second synthetic time-series data segments that correspond to a second time scale different from the first time scale.

9. The method of claim 2,
   wherein generating the synthetic time-series data segments comprises, during the training of the machine learning model, executing the machine learning model to generate synthetic three-dimensional time-series spatial data that corresponds to the first time scale, and
   wherein performing the updating of the machine learning model or the termination of the training of the machine learning model comprises performing the updating of the machine learning model or the termination of the training of the machine learning model based on a given comparison of the reference distribution measure and a given synthetic distribution measure associated with the synthetic three-dimensional time-series spatial data that corresponds to the first time scale.

10. One or more non-transitory computer-readable media comprising instructions that, when executed by one or more processors, causes operations comprising:
   storing, in one or more databases, reference time-series data segments;
   during training of a machine learning model, executing the machine learning model to generate synthetic time-series data segments;
   with respect to a first time scale, obtaining a first reference subset of the reference time-series data segments that corresponds to the first time scale in connection with autocorrelation of a first synthetic subset of the synthetic time-series data segments that corresponds to the first time scale; and
   based on a comparison of an autocorrelation of (i) a reference distribution measure associated with the first reference subset of the reference time-series data segments and (ii) a synthetic distribution measure associated with the first synthetic subset of the synthetic time-series data segments, performing (i) updating of the machine learning model in connection with the training of the machine learning model or (ii) termination of the training of the machine learning model.

11. The one or more non-transitory computer-readable media of claim 10, wherein performing the updating of the machine learning model or the termination of the training of the machine learning model comprises performing the updating of the machine learning model or the termination of the training of the machine learning model based on a given comparison with respect to a regression of a time-based function applied to the first reference subset of the reference time-series data segments and a regression of a time-based function applied to the first synthetic subset of the synthetic time-series data segments.

12. The one or more non-transitory computer-readable media of claim 10, wherein performing the updating of the machine learning model or the termination of the training of the machine learning model comprises performing the updating of the machine learning model or the termination of the training of the machine learning model based on a performance metric derived from the comparison.

13. The one or more non-transitory computer-readable media of claim 10, wherein performing the updating of the machine learning model or the termination of the training of the machine learning model comprises performing the updating of the machine learning model or the termination of the training of the machine learning model based on a similarity metric derived from the comparison.

14. The one or more non-transitory computer-readable media of claim 10, further comprising generating a synthetic dataset by combining sequences of the synthetic time-series data segments.

15. The one or more non-transitory computer-readable media of claim 10, wherein the reference distribution measure comprises at least one of a normalized distribution, a gaussian distribution, a Bernoulli distribution, a binomial distribution, a normal distribution, a Poisson distribution, or an exponential distribution.

16. The one or more non-transitory computer-readable media of claim 10, wherein generating the synthetic time-series data segments comprises, during the training of the machine learning model, executing the machine learning model to generate (i) first synthetic time-series data segments that corresponds to the first time scale and (ii) second synthetic time-series data segments that correspond to a second time scale different from the first time scale.

17. The one or more non-transitory computer-readable media of claim 10,
   wherein generating the synthetic time-series data segments comprises, during the training of the machine learning model, executing the machine learning model to generate synthetic three-dimensional time-series spatial data that corresponds to the first time scale, and
   wherein performing the updating of the machine learning model or the termination of the training of the machine learning model comprises performing the updating of the machine learning model or the termination of the training of the machine learning model based on a given comparison of the reference distribution measure and a given synthetic distribution measure associated with the synthetic three-dimensional time-series spatial data that corresponds to the first time scale.

* * * * *